United States Patent
Katsuyama et al.

(10) Patent No.: US 11,216,930 B2
(45) Date of Patent: Jan. 4, 2022

(54) INFORMATION PROCESSING APPARATUS, CRACK LINE DETECTION METHOD, AND RECORDING MEDIUM RECORDING PROGRAM

(71) Applicant: FUJITSU LIMITED, Kawasaki (JP)

(72) Inventors: Yutaka Katsuyama, Yokohama (JP); Eigo Segawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 124 days.

(21) Appl. No.: 16/723,345

(22) Filed: Dec. 20, 2019

(65) Prior Publication Data
US 2020/0226737 A1 Jul. 16, 2020

(30) Foreign Application Priority Data

Jan. 11, 2019 (JP) .................................. 2019-003564

(51) Int. Cl.
*G06T 7/00* (2017.01)
*G06T 7/11* (2017.01)
(Continued)

(52) U.S. Cl.
CPC ....... *G06T 7/0002* (2013.01); *G01N 21/8803* (2013.01); *G01N 21/8851* (2013.01);
(Continued)

(58) Field of Classification Search
CPC ....... G06T 7/0002; G06T 7/11; G06T 11/203; G06T 2207/30168; G06T 2207/20072;
(Continued)

(56) References Cited

U.S. PATENT DOCUMENTS 10,540,760 B2* 1/2020 Liu .......................... G06T 7/60
2018/0137612 A1* 5/2018 Li ........................... G06T 7/001
(Continued)

FOREIGN PATENT DOCUMENTS

EP 0 342 242 A1 11/1989
JP 63-228269 A 9/1988
(Continued)

OTHER PUBLICATIONS

O.Zou et al., "CrackTree: Automatic crack detection from pavement images", Pattern Recognition Letters, vol. 33, No. 3, pp. 227-238, Feb. 1, 2012. [retrieved on Nov. 12, 2011] Cited in Extended European Search Report (EESR) dated May 26, 2020 for corresponding European Patent Application No. 19217487.8.
(Continued)

*Primary Examiner* — Jerome Grant, II
(74) *Attorney, Agent, or Firm* — Fujitsu Patent Center

(57) ABSTRACT

An information processing apparatus includes: a processor configured to: partition an image of a structure into regions; detect, for target regions each including crack points among the regions, a representative line segment representing the crack points included in each target region as a basic line segment for each target region; generate, based on basic line segments whose end points are close to each other among the detected basic line segments, a tree structure having an end point of a specific basic line segment as a root; and detect, among routes in the generated tree structure, routes from a top to a bottom of the tree structure corresponding to a basic line segment group in which values indicating degrees of coupling probability between the basic line segments are highest and a total length of the basic line segments coupled is longest, as a stroke corresponding to crack lines.

12 Claims, 19 Drawing Sheets

(51) Int. Cl.
*G01N 21/88* (2006.01)
*G06T 11/20* (2006.01)

(52) U.S. Cl.
CPC .............. *G06T 7/11* (2017.01); *G06T 11/203* (2013.01); *G06T 2207/30168* (2013.01)

(58) Field of Classification Search
CPC . G06T 2207/20021; G06T 7/13; G06T 7/162; G01N 21/8803; G01N 21/8851; G01N 2021/8887
USPC ........................................................ 382/141
See application file for complete search history.

(56) References Cited

U.S. PATENT DOCUMENTS

| 2018/0300874 | A1 | 10/2018 | Karube | |
|---|---|---|---|---|
| 2018/0308230 | A1* | 10/2018 | Karube | ................ G06T 7/0002 |
| 2019/0003830 | A1 | 1/2019 | Irie | |
| 2019/0066296 | A1* | 2/2019 | Lee | ........................... G06T 7/00 |
| 2019/0359329 | A1* | 11/2019 | Gavrilov | ................ B08B 3/024 |
| 2019/0371008 | A1* | 12/2019 | Peterson | ................... G06T 7/13 |

FOREIGN PATENT DOCUMENTS

| JP | 6-274630 A | 9/1994 |
|---|---|---|
| JP | 2000-28541 A | 1/2000 |
| WO | 2017/119154 A1 | 7/2017 |
| WO | 2017/126367 A1 | 7/2017 |

OTHER PUBLICATIONS

A. Mohan et al., "Crack detection using image processing: A critical review and analysis", Alexandria Engineering Journal: AEJ, vol. 57, No. 2, pp. 787-798, Jun. 1, 2018. Cited in Extended European Search Report (EESR) dated May 26, 2020 for corresponding European Patent Application No. 19217487.8.
EESR—Extended European Search Report of European Patent Application No. 19217487.8 dated May 26, 2020.

* cited by examiner

INFORMATION PROCESSING APPARATUS, CRACK LINE DETECTION METHOD, AND RECORDING MEDIUM RECORDING PROGRAM

CROSS-REFERENCE TO RELATED APPLICATION

This application is based upon and claims the benefit of priority of the prior Japanese Patent Application No. 2019-3564, filed on Jan. 11, 2019, the entire contents of which are incorporated herein by reference.

FIELD

The embodiment discussed herein is related to a crack line detection apparatus, a crack line detection method, and a recording medium.

BACKGROUND

In order to check a cracking state of a structure such as a bridge, an operation to record, on a drawing, cracks in a surface of the structure is carried out by visual inspection and handwriting. The operator describes crack lines by handwriting on a drawing while referring to, for example, a photograph. The crack lines are described in the form of a stroke, which is a longest and continuous line including the crack lines. However, this operation takes time and is burdensome work.

Japanese Laid-open Patent Publication No. 63-228269 is an example of related art.

SUMMARY

According to an aspect of the embodiments, an information processing apparatus includes: a memory; and a processor coupled to the memory and configured to: partition an image acquired by photographing a structure into a plurality of regions; detect, for a plurality of target regions each including a plurality of crack points among the plurality of regions, a representative line segment representing the plurality of crack points included in each of the plurality of target regions as a basic line segment for each of the plurality of target regions; generate based on basic line segments whose end points are close to each other among the detected basic lire segments, a tree structure having an end point of a specific basic line segment as a root; and detect, among a plurality of routes in the generated tree structure, routes from a top to a bottom of the tree structure corresponding to a basic line segment group in which values indicating degrees of coupling probability between the basic line segments are highest and a total length of the basic line segments coupled is longest, as a stroke corresponding to crack lines.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In order to reduce the time and the amount of work, there is a technique for automatically detecting a crack line from an image captured with a camera. In this technique, the image is partitioned into a plurality of rectangular regions, and the image is rotated and projected within each rectangular region to acquire features of line segments in the image, such as a width, a length, a direction, and a coordinate position. Then, when an angle formed by adjacent line segments is close to 180°, a distance between end points of the adjacent line segments is short, and midpoints of the adjacent line segments are arranged substantially being aligned horizontally, or when adjacent line segments intersect each other, the two adjacent line segments are integrated.

In the above technique, since only associated information between two adjacent line segments detected from the rectangular regions is used to integrate the line segments, there is a possibility that a longest and continuous crack line is not acquired from among the candidates for crack lines. In addition, when line segments are integrated, continuity of crack points is not taken into consideration, so that there is a risk that line segments that are not actually continued are integrated.

A stroke corresponding to a group of longest and continuous crack lines from among the candidates for crack lines representing crack points may be detected.

Hereinafter, an example of the embodiment will be described in detail with reference to the accompanying drawings.

Figure 1:
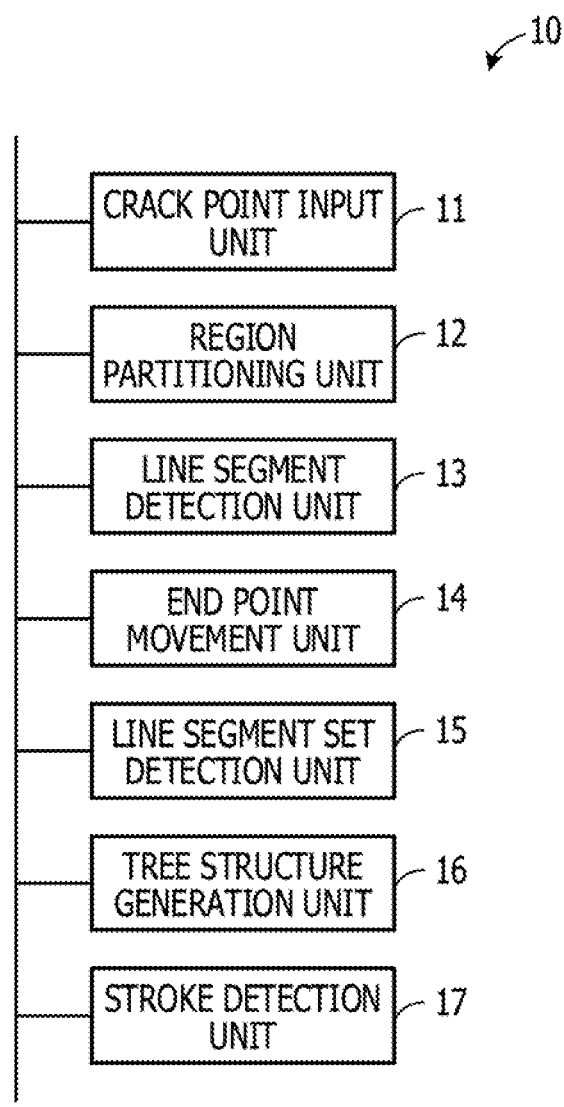
FIG. 1 is a block diagram illustrating an example of a principal function of a crack line detection apparatus.

A crack line detection apparatus 10 exemplified in FIG. 1 includes a crack point input unit 11, a region partitioning unit 12, a line segment detection unit 13, an end point movement unit 14, a line segment set detection unit 15, a tree structure generation unit 16, and a stroke detection unit 17.

Figure 2A:
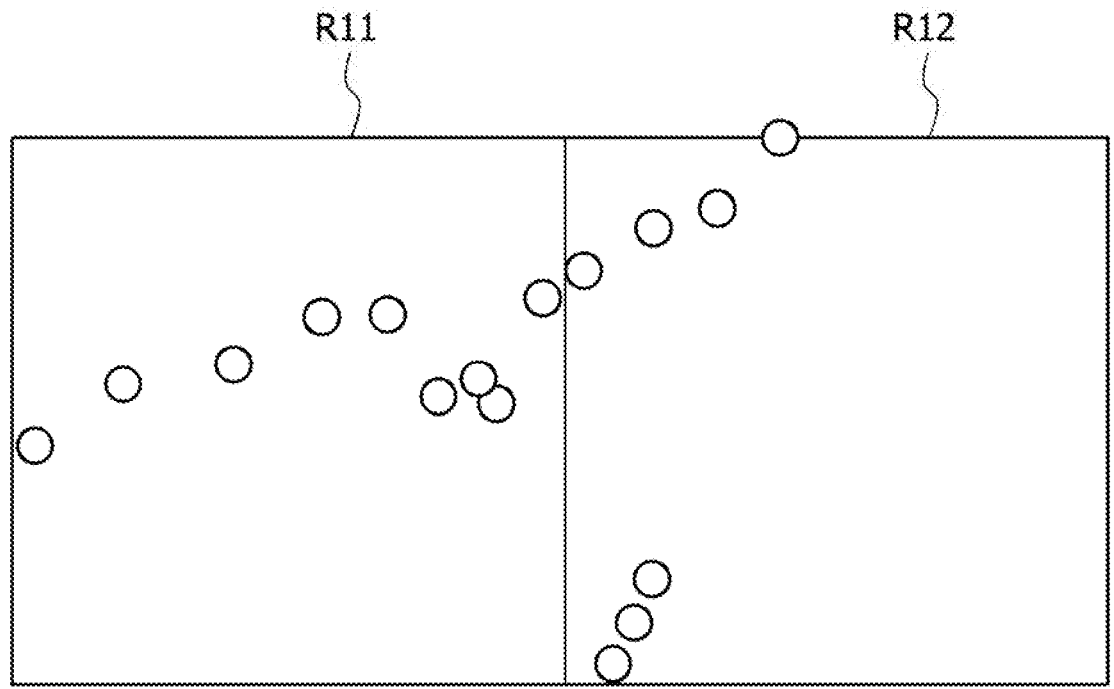
FIG. 2A is a conceptual diagram exemplifying a region and a crack point.

For example, the crack point input unit 11 receives an image including a crack point, obtained by photographing a surface of a structure such as a bridge, in which the crack point appears clearly by the crack point being subjected to an existing pre-process such as subtractive color processing and color-emphasis processing. The crack point is a point representing a crack and is included in a crack line in many cases, but may exist independently. The region partitioning unit 12 partitions the image into a plurality of regions having a predetermined size. Each of the regions may be a rectangular region of 100 pixels by 100 pixels, for example. FIG. 2A describes an example in which illustrated are a state of an image being partitioned into regions R11 and R12, and crack points represented by circle marks.

The line segment detection unit 13 detects one representative line segment from each of the regions R11 and R12. The representative line segment is a line segment representing crack points included in the region, and is a straight line extending to a boundary between the regions. The representative line segment may be, for example, a regression line acquired by using coordinate information of each of the crack points.

The regression line is a straight lime representing a distribution trend of crack points, and is calculated by the least square method from the coordinate information of each of the crack points. With this, even when crack points are detected in a skipped form and contains noise, it is possible to appropriately acquire a representative line segment representing the crack points.

When an average value of distances between the representative line segment and the crack points is larger than a predetermined threshold value, the line segment detection unit 13 further partitions the region into a plurality of regions corresponding to small regions, and detects one representative line segment from each of the partitioned small regions. The partitioning of the region and detection of a representative line segment is repeated until the average value of the distances between the representative line segment and the crack points becomes equal to or smaller than the predetermined threshold value.

This is because when the average value of the distances between the representative line segment and the crack points is greater than the predetermined threshold value, there is a high possibility that the crack points in the region are represented by two or more line segments. The predetermined threshold value may be, for example, five pixels. In place of the average value of the distances between the representative line segment and the crack points, for example, a maximum value of the distances between the representative line segment and the crack points may be used, or a variance value of the distances between the representative line segment and the crack points may be used.

Figure 2B:
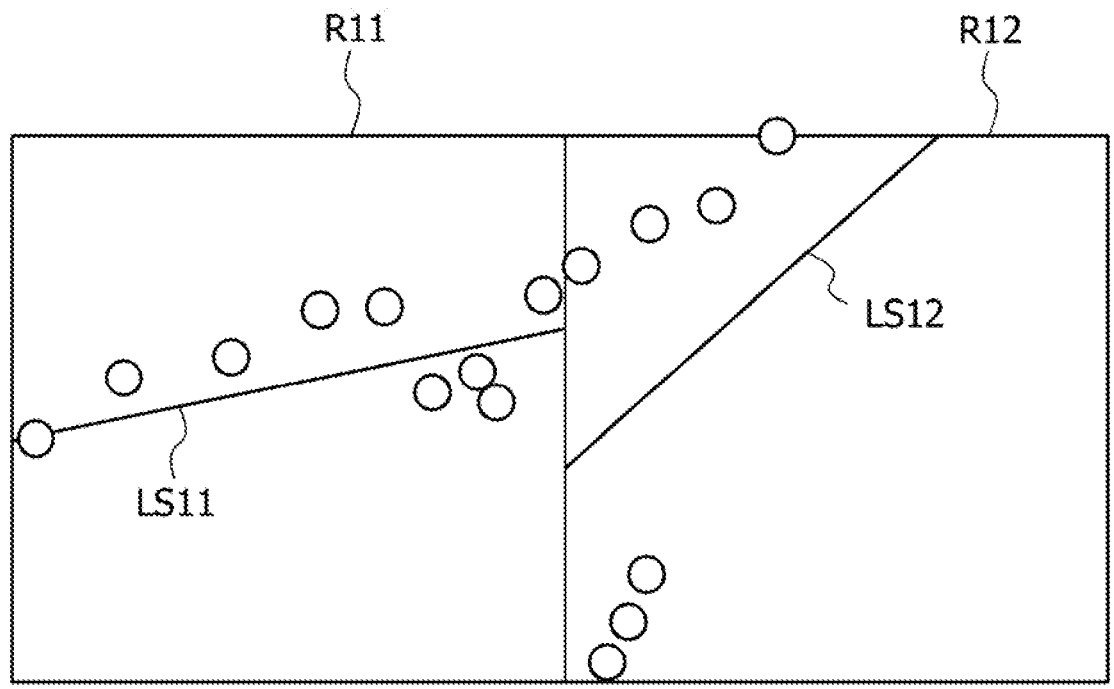
FIG. 2B is a conceptual diagram exemplifying a representative line segment.

FIG. 2B illustrates an example of a representative line segment LS11 representing a plurality of crack points included in the region R11 and a representative line segment LS12 representing a plurality of crack points included in the region R12. The line segment detection unit 13 determines whether or not the average value of the distances from the respective crack points to the representative line segment is greater than the predetermined threshold value for each region, A case will be described below in which, as exemplified in FIG. 2B, the average value of the distances from the crack points to the representative line segment LS11 is equal to or smaller than the predetermined threshold value in the region R11, and in the region R12, the average value of the distances from the crack points to the representative line segment LS12 is greater than the predetermined threshold value.

Figure 2C:
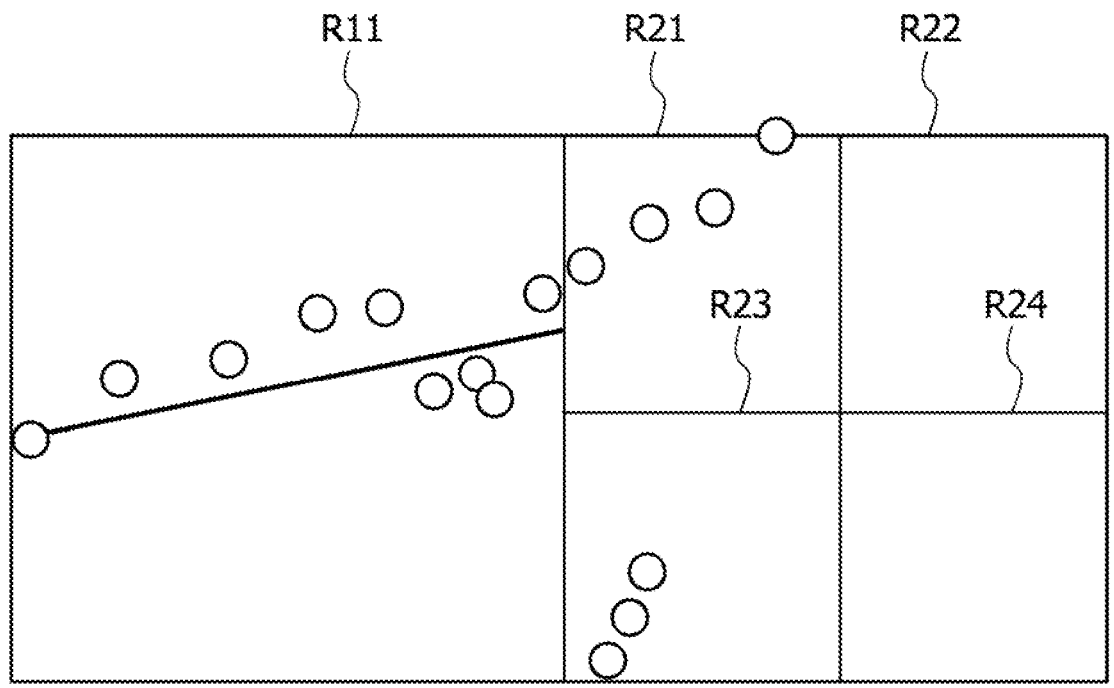
FIG. 2C is a conceptual diagram exemplifying small regions obtained by partitioning a region.
Figure 2D:
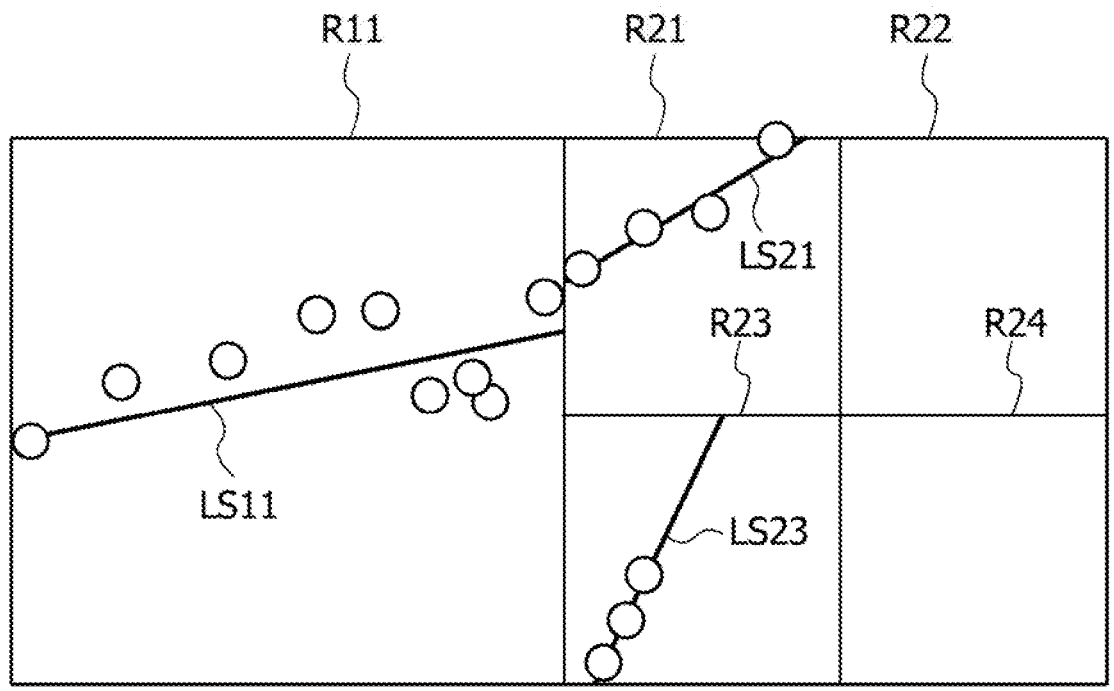
FIG. 2D is a conceptual diagram exemplifying a representative line segment.

The region R12 where the average value of the distances is greater than the predetermined threshold value is further partitioned into a plurality of regions corresponding to small regions, FIG. 2C illustrates an example in which the region R12 is partitioned into four small regions R21, R22, R23, and R24. The line segment detection unit 13 detects one representative line segment from each of the small regions. FIG. 2D illustrates an example of a line segment LS21 representing crack points in the region R21 and a line segment LS23 representing crack points in the region R23. Since no crack point is present n the small regions R22 and R24, no representative line segment is detected.

When a representative line segment exists on a rectangular region boundary, the representative line segment may not be detected by the method described above. As such, in a case where a predetermined number or more of crack points are present on or near a rectangular region boundary, when the rectangular region boundary extends in a longitudinal direction, a line segment extending in the longitudinal direction along the rectangular region boundary is detected, and when the rectangular region boundary extends in a lateral direction, a line segment extending in the lateral direction along the rectangular region boundary is detected. When a representative line segment representing the crack points in the rectangular region is already present in the vicinity of the detected line segment in the longitudinal direction or the detected line segment in the lateral direction, the detected line segment in the longitudinal direction or the detected line segment in the lateral direction is removed.

Figure 3:
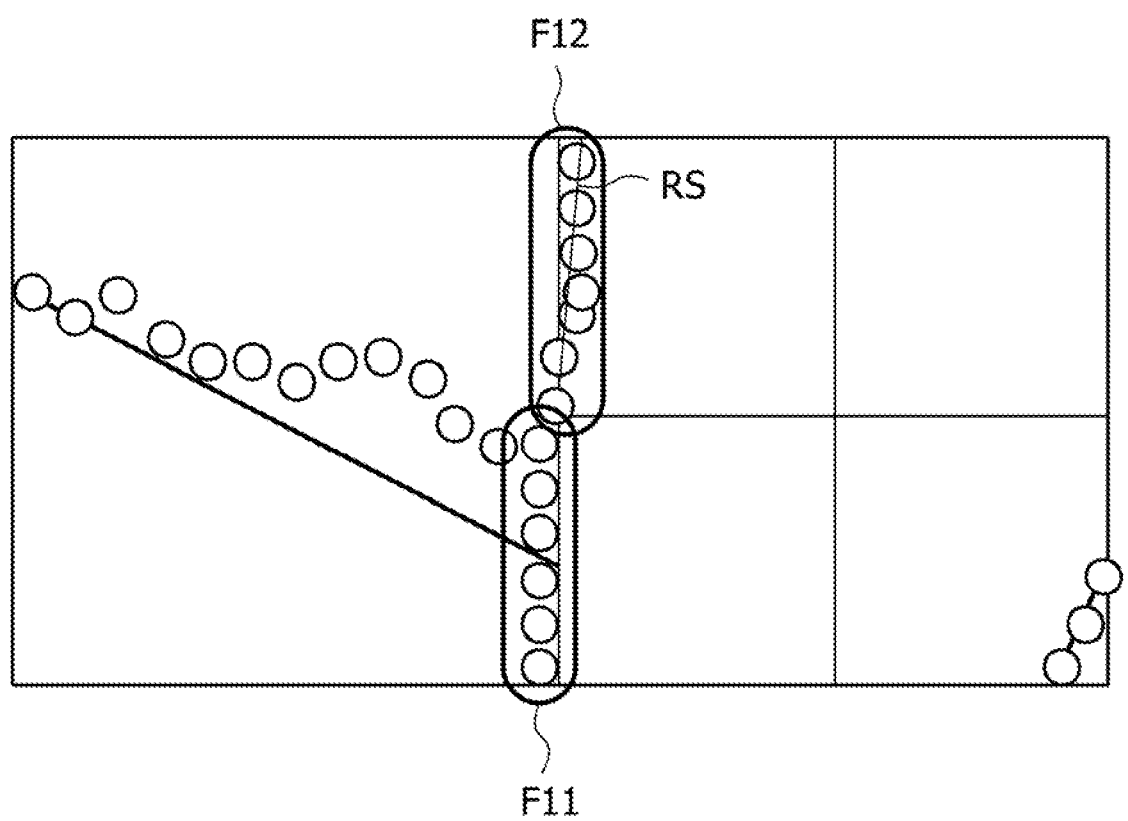
FIG. 3 is a conceptual diagram explaining a handling process of crack, points on a rectangular region boundary and near the rectangular region boundary.

In FIG. 3, a case in which crack points are present on and near a rectangular region boundary is exemplified. For example, since a predetermined number or more of crack points exist on and near rectangular region boundaries indicated by F11 and F12, representative line segments in the longitudinal direction along the rectangular region boundaries are detected as representative line segments. Since, in the vicinity of the rectangular region boundary indicated by F12, a representative line segment RS representing the crack points in the rectangular region is already present, the line segment in the longitudinal direction detected at F12 is removed. This is because there is a high possibility that the representative line segment RS is a line segment that represents the crack points more appropriately than the line segment along the rectangular region boundary.

The end point movement unit 14 moves an end point of a representative line segment on a region boundary, thereby generating an end point movement line segment which appropriately represents the crack points in the region and enhances a degree of coupling probability to a line segment of an adjacent region.

For example, when crack points exist on a region boundary, the end point movement unit 14 moves a first end point to a crack point on the region boundary closest to the first end point, or to a crack point whose projecting point to the representative line segment is farthest from a second end point of the representative line segment. Which of the crack points is to be taken as a movement destination is determined depending on which of the above-mentioned movements makes the line segment more appropriately represent the crack points in the region. When there is no crack point on the region boundary the first end point is moved to a crack point whose projecting point to the representative line segment is farthest from the second end point of the representative line segment.

Figure 2E:
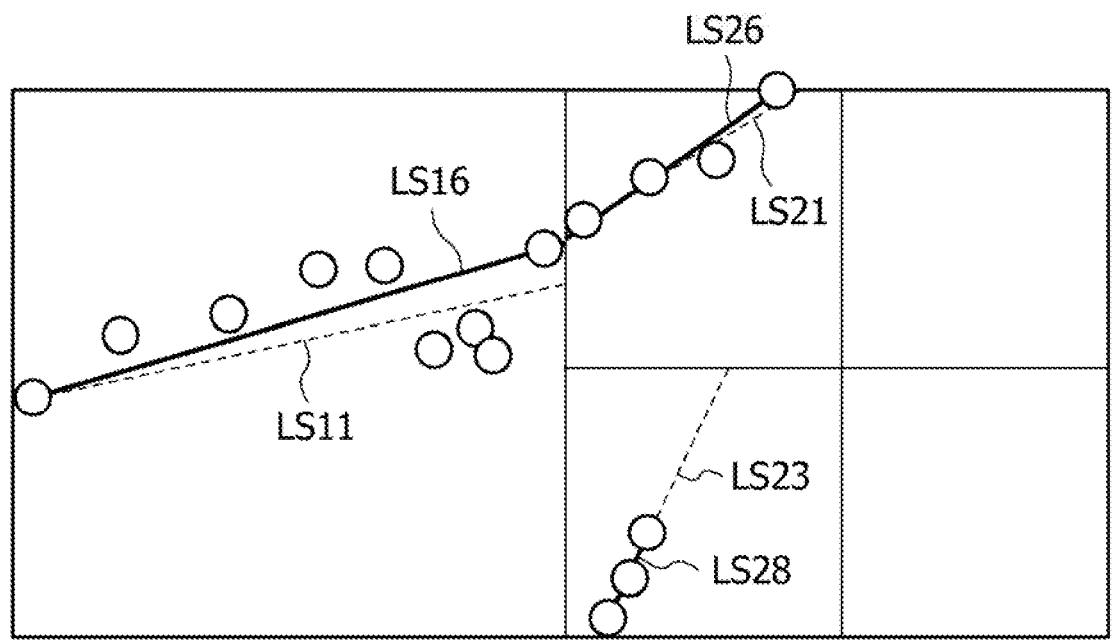
FIG. 2E is a conceptual diagram exemplifying an end point movement line segment.

In FIG. 2E, exemplified are an end point movement line segment LS16 corresponding to the representative line segment LS11 exemplified in FIG. 2D, an end point movement line segment LS26 corresponding to the representative line segment LS21 exemplified in FIG. 2D, and an end point movement line segment LS28 corresponding to the representative line segment LS23 exemplified in FIG. 2D. In FIG. 2E, each of the representative line segments is indicated with a broken line, and each of the end point movement line segments is indicated with a solid line.

The end point movement line segment LS16 is generated in the following manner: a first end point of the representative line segment LS11 is moved to a crack point whose projecting point to the representative line segment is farthest from a second end point, and the second end point is moved to a crack point whose projecting point to the representative line segment is farthest from the first end point.

The end point movement line segment LS26 is generated in the following manner: a first end point of the representative line segment LS21 is moved to a crack point whose projecting point to the representative line segment is farthest from a second end point, and the second end point is moved to a crack point on a region boundary closest to the second end point. The end point movement line segment LS28 is generated in the following manner: a first end point on a region boundary is moved to a crack point whose projecting point to the representative line segment is farthest from a second end point, and the second end point is moved to a crack point whose projecting point to the representative line segment is farthest from the first end point.

Figure 4A:
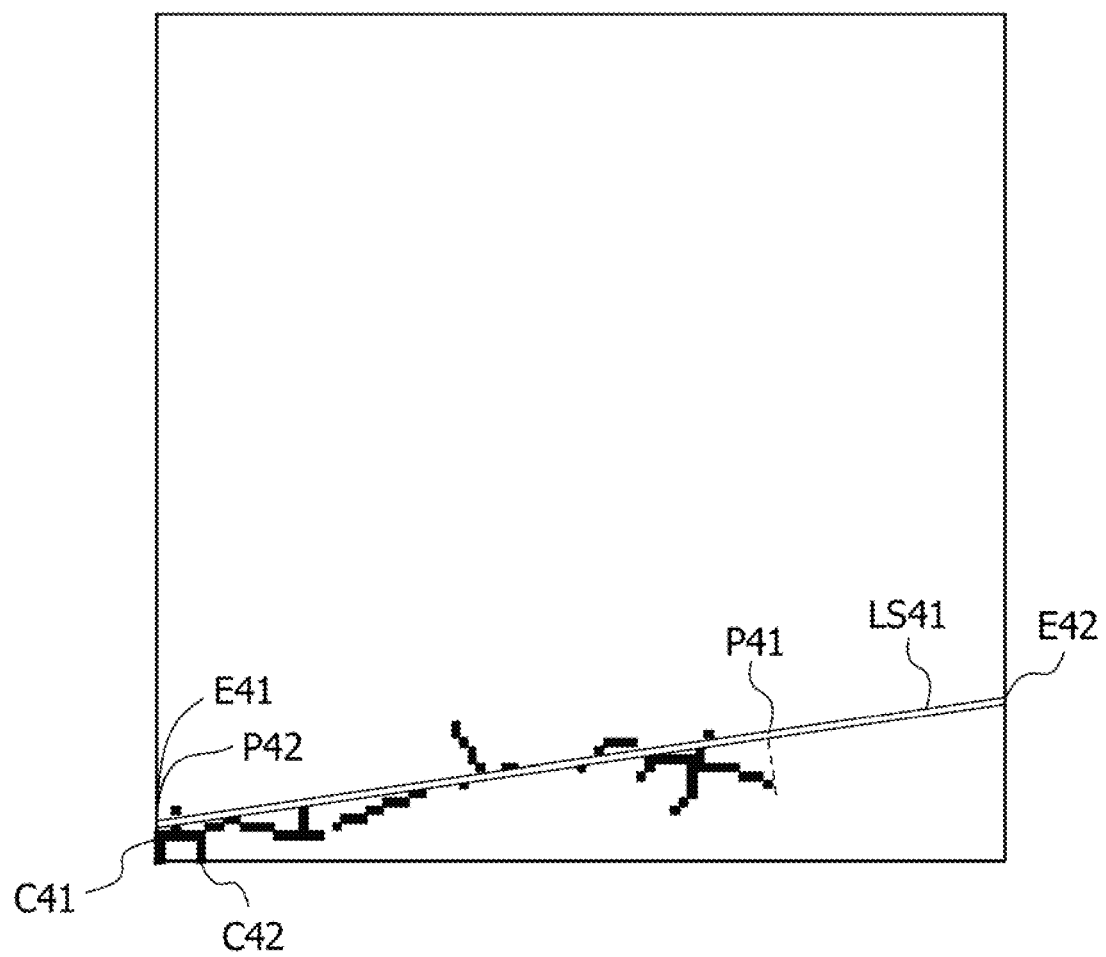
FIG. 4A is a conceptual diagram explaining a generation process of an end point movement line segment.
Figure 4B:
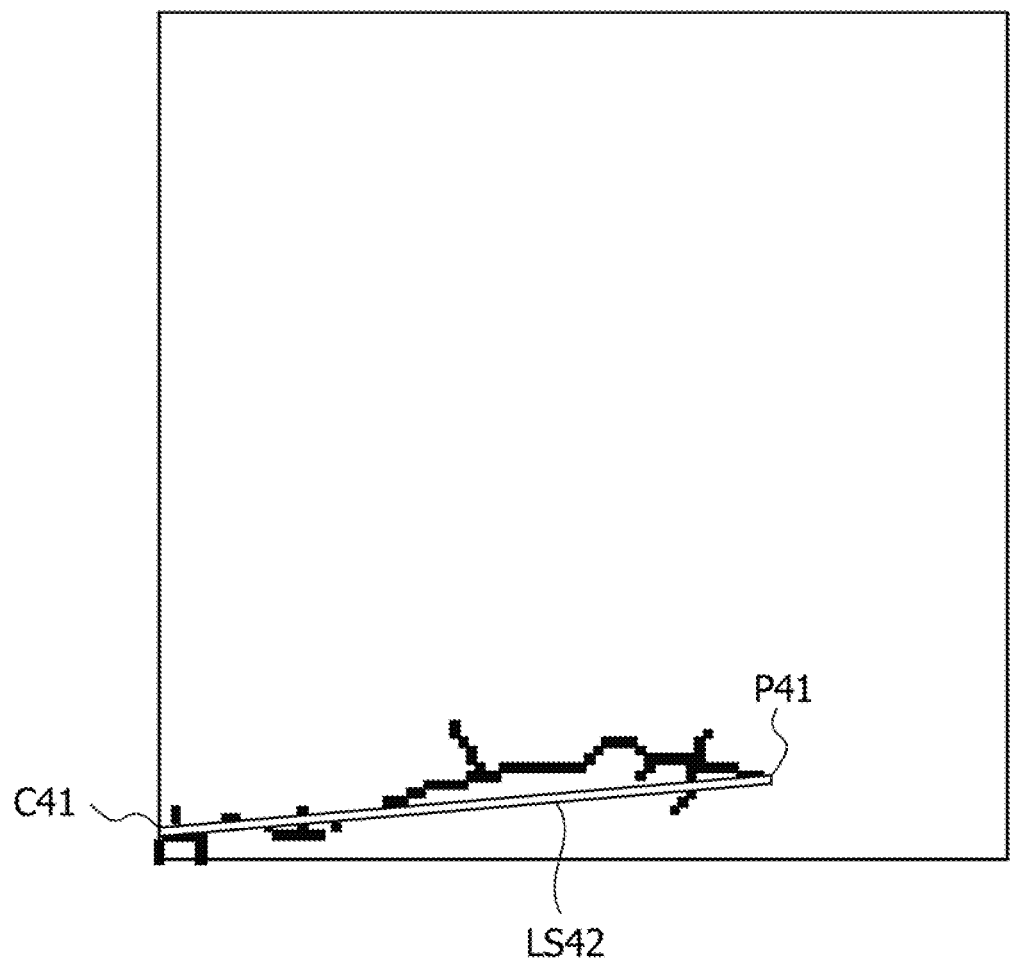
FIG. 4B is also a conceptual diagram explaining a generation process of an end point movement line segment.

An example of an end point movement line segment generation process will be described with reference to FIGS. 4A and 4B, As exemplified in FIG. 4A, the end point movement unit 14 sets, among the crack points on a region boundary, a crack point closest to one end point E41 of a representative line segment LS41 along the region boundary, to C41.

Next, the end point movement unit 14 sets, among the crack points on the region boundary, a crack point closest to another end point E42 of the representative line segment LS41 along the region boundary, to C42. The end point movement unit 14 sets, among the projecting points obtained by projecting the crack points in the region to the line segment LS41, a projecting point farthest from the end point E41 to P41, and among the projecting points, a projecting point farthest from the end point E42 to P42.

The end point movement unit 14 moves both the end points of the representative line segment LS41 to end points of a line segment where the number of crack points present near the line segment is greatest, among four line segments C41-C42, C41-P41, P42-C42, and P42-P41. In the example of FIG. 4A, since the number of crack points present near the line segment C41-P41 is greatest, an end point movement line segment is generated by moving the end point E41 to C41 and moving the end point E42 to P41. FIG. 4B exemplifies a generated end point movement line segment LS42.

The line segment set detection unit 15 detects a line segment set in which end points of line segments are close to each other, from among the representative line segments and end point movement line segments, each of which is an example of a basic line segment. The line segment set detection unit 15 selects one line segment A from among the representative line segments and the end point movement line segments, and makes the selected line segment A be included in the line segment set.

The line segment set detection unit 15 selects, from among the representative line segments and the end point movement line segments, a line segment B where a distance between an end point of the line segment A and any one of end points thereof is smaller than a predetermined threshold value, and makes the selected line segment B be included in the line segment set, A plurality of line segments B may be present.

The line segment set detection unit 15 sets the line segment B to the line segment A, and repeats the same process as described above until there is no line segment B where a distance between an end point of the line segment A and an end point of the line segment B is smaller than the predetermined threshold value. When there is no line segment B where the distance between an end point of the line segment A and an end point of the line segment B is smaller than the predetermined threshold value, the line segment set detection unit 15 sets the line segments in the line segment set as the processed line segments, records the line segment set, and then generates a subsequent line segment set by using unprocessed line segments.

The tree structure generation unit 16 generates a tree structure from line segments included in a line segment set. The tree structure generation unit 16 selects, from among the line segments included in the line segment set, the leftmost line segment and causes a left end point of the selected line segment to be a root, or selects the uppermost line segment and causes an upper end point of the elected line segment to be a root. For example, when the overall shape of the line segment set is extended in the lateral direction the leftmost line segment is selected, and when the overall shape of the line segment set is extended in the longitudinal direction, the uppermost line segment is selected.

The tree structure generation unit 16 selects, from the line segments included in the line segment set, a line segment where a distance between the root and an end point thereof close to the root is equal to or smaller than a predetermined threshold value, and couples, to the root, the end point of the line segment close to the root. The line segment coupled to the root is a branch of the tree structure, and a plurality of such line segments may be present.

The tree structure generation unit 16 takes each end point, distant from the root, of a line segment having the root and a line segment coupled to the root as a growth point; selects, from among the line segments included in the line segment set, a line segment where a distance between the growth point and an end point thereof close to the growth point is equal to or smaller than a predetermined threshold value; and couples the end point close to the growth point to the growth point. The line segment coupled to the growth point as a growth line segment is a branch of the tree structure, and a plurality of such line segments may be present.

The tree structure generation unit 16 repeats the following processing. For example, the tree structure generation unit 16 takes an end point, different from the growth point of the growth line segment, as a new growth point; selects, from among the line segments included in the line segment set, a line segment where a distance between the new growth point and an end point thereof close to the new growth point is equal to or smaller than a predetermined threshold value; and couples, to the new growth point, the end point close to the new growth point.

There may be present a plurality of line segments coupled to the new growth point as new growth line segments. When there is no line segment where the distance between the new growth point and an end point thereof close to the new growth point is equal to or smaller than the predetermined threshold value, the line segments included in the tree structure are set as the processed line segments, the tree structure is recorded, and then a new tree structure is generated by using unprocessed line segments.

Figure 5A:
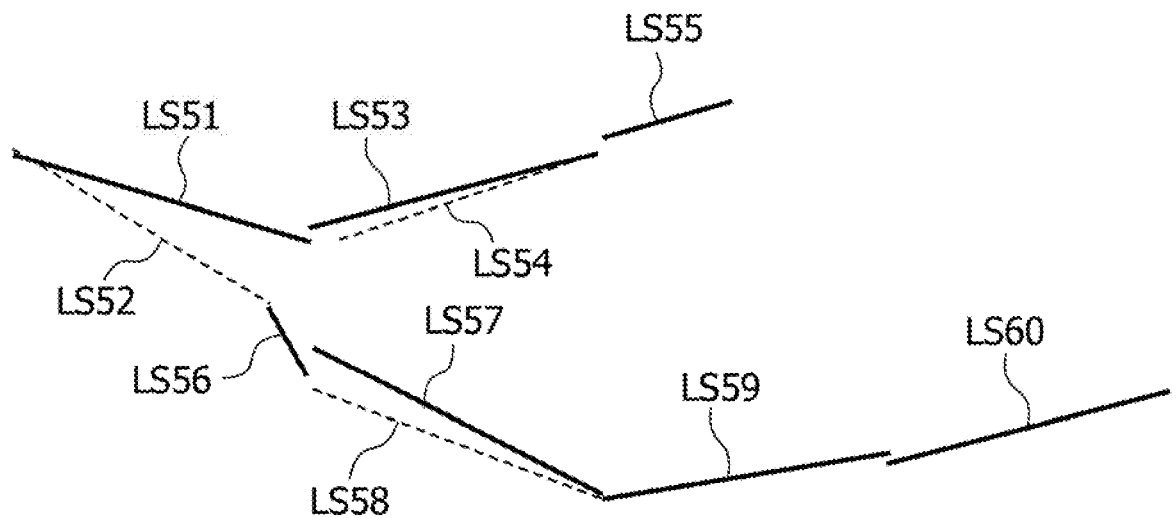
FIG. 5A is a conceptual diagram exemplifying a representative line segment and an end point movement line segment included in a line segment set.

An example of generating a tree structure of a case where a line segment set includes line segments LS51 to LS60 will be described with reference to FIGS. 5A and 5B. In FIG. 5A, a solid line represents a representative line segment, and a broken line represents an end point movement line segment. Since the overall shape of the line segment set is extended in the lateral direction, the tree structure generation unit 16 selects the leftmost line segment LS51 in FIG. 5A, adds the selected line segment to the tree structure as exemplified in FIG. 5B, and takes a left end point of the line segment LS51 as a root.

Figure 5B:
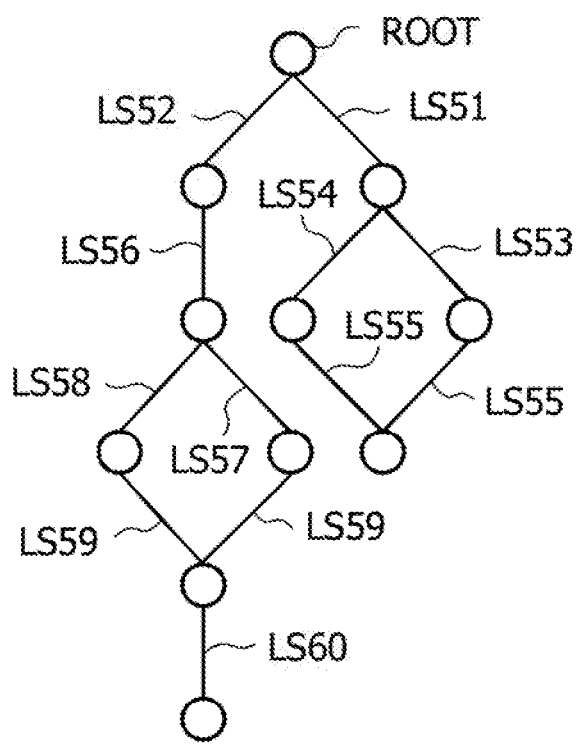
FIG. 5B is a conceptual diagram illustrating air example of a tree structure.

The tree structure generation unit 16 selects the line segment LS52 having an end point within a predetermined distance from the root, and adds the selected line segment to the tree structure as exemplified in FIG. 5B. The line segments LS51 and LS52 are branches of the tree structure. In the example of FIG. 5A, since any other line segment having an end point within a predetermined distance from the root is not present, an end point different from the root of the line segment LS51 and an end point on the opposite side to the root of the line segment LS52 are set to be growth points.

The tree structure generation unit 16 selects the line segments LS53 and LS54 each having an end point within a predetermined distance from the growth point of the line segment LS51, and adds the selected line segments to the tree structure as exemplified in FIG. 5B. The line segments LS53 and LS54 are branches of the tree structure. Further, the tree structure generation unit 16 selects the line segment LS56 having an end point within a predetermined distance from the growth point of the line segment LS52, and adds the selected line segment to the tree structure as exemplified in FIG. 5B. The line segment LS56 is a branch of the tree structure.

The tree structure generation unit 16 sets end points of the line segments LS53, LS54, and LS56 far from the growth points of the line segments LS51 and LS52 as new growth points. Although detailed explanation will not be given in the following description, the tree structure generation unit 16 repeats the same processing as discussed above until there is no line segment having an end point within a predetermined distance from the growth point, thereby generating the tree structure for each line segment set.

An example in which both a representative line segment and an end point movement line segment, each of which is an example of a basic line segment, are used when generating a tree structure has been described, but the present embodiment is not limited thereto. For example, the tree structure may be generated by using only one of a representative line segment and an end point movement line segment.

Figure 6A:
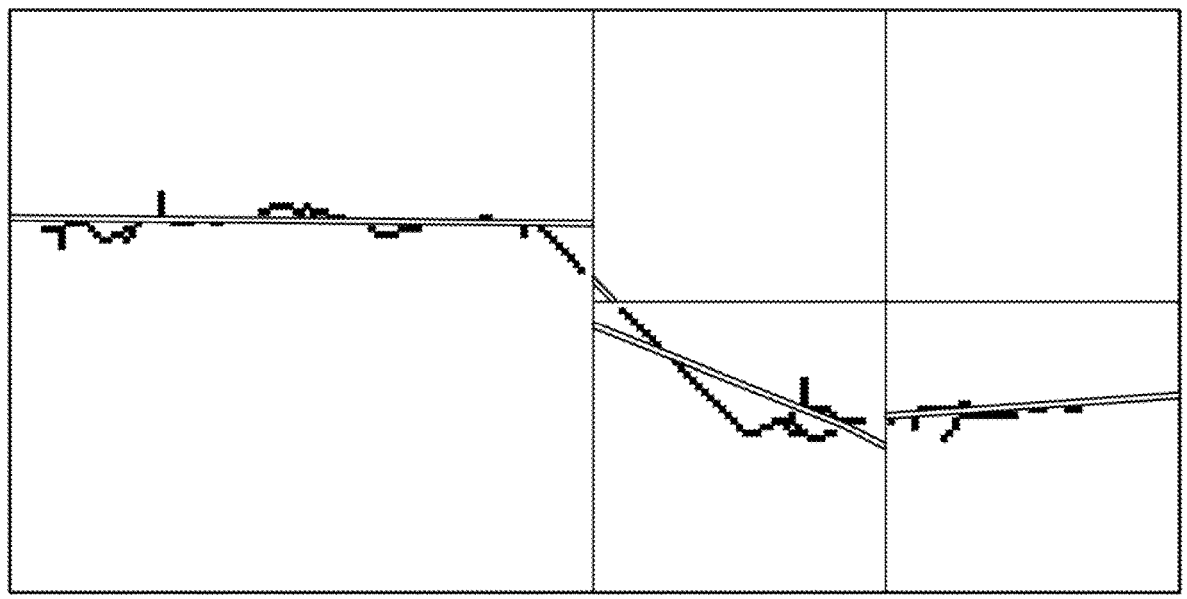
FIG. 6A is a conceptual diagram illustrating an example of a representative line segment.
Figure 6B:
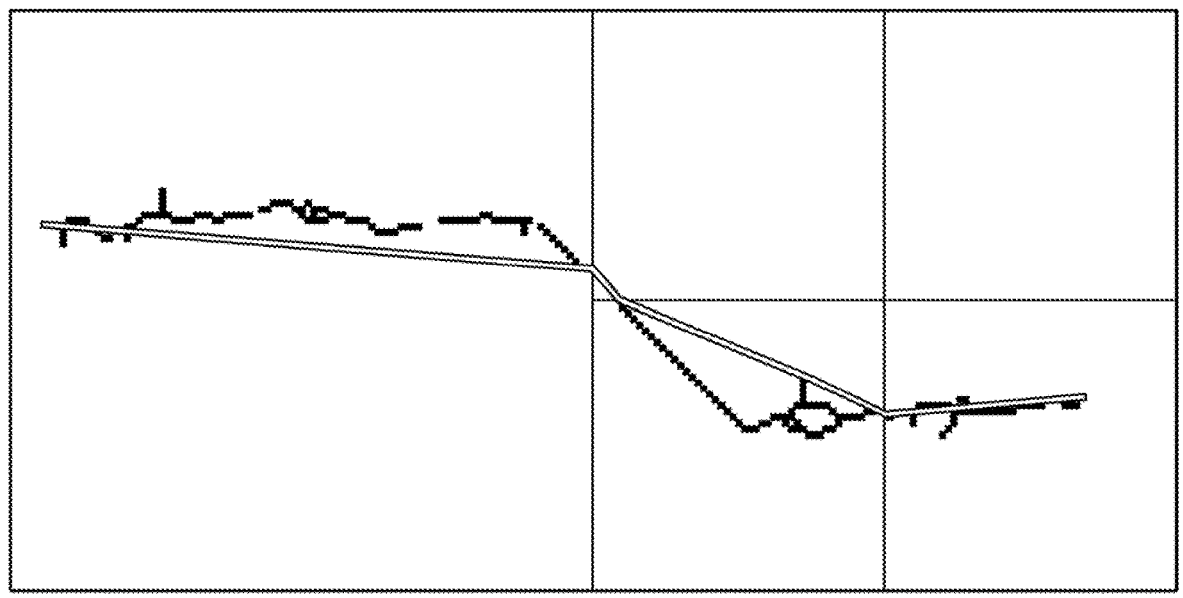
FIG. 6B is a conceptual diagram illustrating an example of an end point movement line segment.

However, when representative line segments exemplified with a whitened line in FIG. 6A are detected, a distance between end points of the representative line segments is long between adjacent regions, so that a possibility that an appropriate tree structure is generated is low. On the other hand, as for end point movement line segments, as exemplified with a whitened line in FIG. 6B, generated from the representative line segments in FIG. 6A, a distance between end points of the end point movement line segment is short between adjacent regions, so that a possibility that an appropriate tree structure is generated is high. Therefore, even when the representative line segments illustrated in FIG. 6A are detected, by using not only the representative line segments but also the end point movement line segments when generating the tree structure, the possibility that a stroke corresponding to a group of longest and continuous crack lines is detected may be enhanced.

The stroke detection unit 17 detects a stroke by selecting, from a plurality of routes included in a tree structure, routes from the top to the bottom of the tree structure having high degrees of coupling probability and having the longest length. The stroke detection unit 17 calculates an index value PV for each route from the top to the bottom of the tree structure by using, for example, Equation (1).

$$PV = w \cdot TL + (1-w) \cdot TP \qquad (1)$$

TL is a sum of the lengths of line segments in the route, and TP is a degree of coupling probability for each route. Note that, w ($0 \leq w \leq 1$) is a predetermined weighting coefficient. The sum TL of the lengths of the line segments in the route is calculated by using, for example, Equation (2).

$$TL = \sum_{i=1}^{N} LEN_i \qquad (2)$$

N is the number of line segments the route, and $LEN_i$ is a length of the i-th line segment in the route.

The degree of coupling probability TP for each route is calculated by using, for example, Equation (3).

$$TP = \frac{\sum_{i=1}^{N-1} p_{ij}}{N-1} \qquad (3)$$

Note that, j equals i+1 (J–i+1), and $p_{ij}$ is a degree of coupling probability between the i-th and j-th line segments, for example, the line segments adjacent to each other in the route. The degree of coupling probability is calculated by using, for example, Equation (4).

$$p_{ij} = pg_{ij} \cdot pan_{ij} \cdot pcon_{ij} \qquad (4)$$

Note that, $pg_{ij}$ is a degree of distance between the i-th line segment and the j-th line segment in the route, $pan_{ij}$ is a degree of inclination difference between the i-th line segment and the j-th line segment, and $pcon_{ij}$ is a degree of continuity between the i-th line segment and the j-th line segment. The degree of distance $pg_{ij}$ is a value calculated based on a distance between adjacent basic line segments, and is calculated by using, for example, Equation (5).

$$pg_{ij}=\max(1-DD_{ij}/ct1,0) \quad (5)$$

$DD_{ij}$ is a distance between an end point of the i-th line segment on a closer side to the j-th line segment and an end point of the j-th line segment on a closer side to the i-th line segment. $DD_{ij}$ is calculated by using, example, Equation (6) when the coordinates of the end point of the i-th line segment are $(x_i, y_i)$ and the coordinates of the end point of the j-th line segment are $(x_j, y_j)$.

$$DD_{ij}=\sqrt{(x_i-x_j)^2+(y_i-y_j)^2} \quad (6)$$

Note that, ct1 is a predetermined coefficient, and when the distance $DD_{ij}$ between the end points is greater than the value of ct1 in Equation (5), the value of $1-DD_{ij}/ct1$ takes a negative value and $pg_{ij}$ is set to 0, so that the degree of distance $pg_{ij}$ between the end points takes a value of equal to or greater than 0 and equal to or smaller than 1, When the distance $DD_{ij}$ between the end points is 0, $pg_{ij}$ is 1, Note that, ct1 may be, for example, a value of height or width of the region, and may be, for example, 100 pixels.

The degree of inclination difference $pan_{ij}$ is a value calculated based on an angle formed by basic line segments, and is calculated, for example, by Equation (7).

$$pan_{ij}=\max(\cos(dan_{ij}),e) \quad (7)$$

Figure 7:
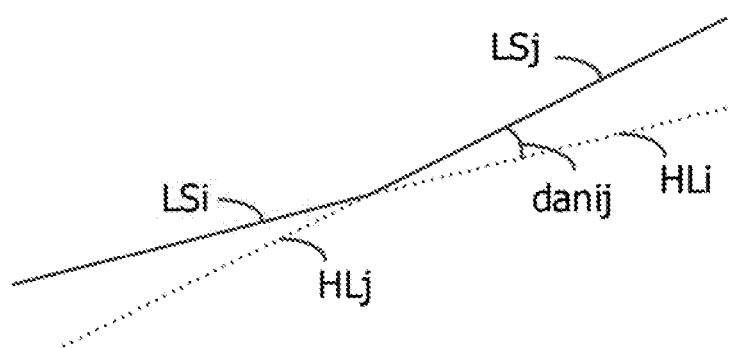
FIG. 7 is a conceptual diagram explaining a degree of inclination difference.

Note that, $dan_{ij}$ is an inclination difference between the i-th line segment $LS_i$ and the j-th line segment $LS_j$; for example, as exemplified in FIG. 7, it is a smaller angle of the angles formed by a line $HL_i$ extending a line segment $LS_i$ and a line $HL_j$ extending a line segment $LS_j$. Accordingly, $dan_{ij}$ takes a value of equal to or greater than 0 [rad] and equal to or smaller than n/2 [rad].

Note that "e" is a predetermined value sufficiently small, and may be, for example, 0.001. When the inclination difference $dan_{ij}$ is n/2 [rad], cos ($dan_{ij}$) becomes 0; however, in Equation (7), since the degree of inclination difference $pan_{ij}$ is not 0 but "e", the degree of inclination difference $pan_{ij}$ takes a value of equal to or greater than e and equal to or smaller than 1. When the inclination difference is 0 [rad], the degree of inclination difference $pan_{ij}$ is 1.

The degree of continuity $pcon_{ij}$ is a value calculated based on a distance between an end point of a basic line segment on a boundary common to basic line segments existing in adjacent regions, and a crack point closest to the above-mentioned end point; for example, it is calculated by using Equation (8).

$$pcon_{ij}=pco_i \cdot pco_j \quad (8)$$

$$pco_i=\max(1-d_i/ct2,0) \quad (9)$$

$$pco_j=\max(1-d_j/ct2,0) \quad (10)$$

Figure 8:
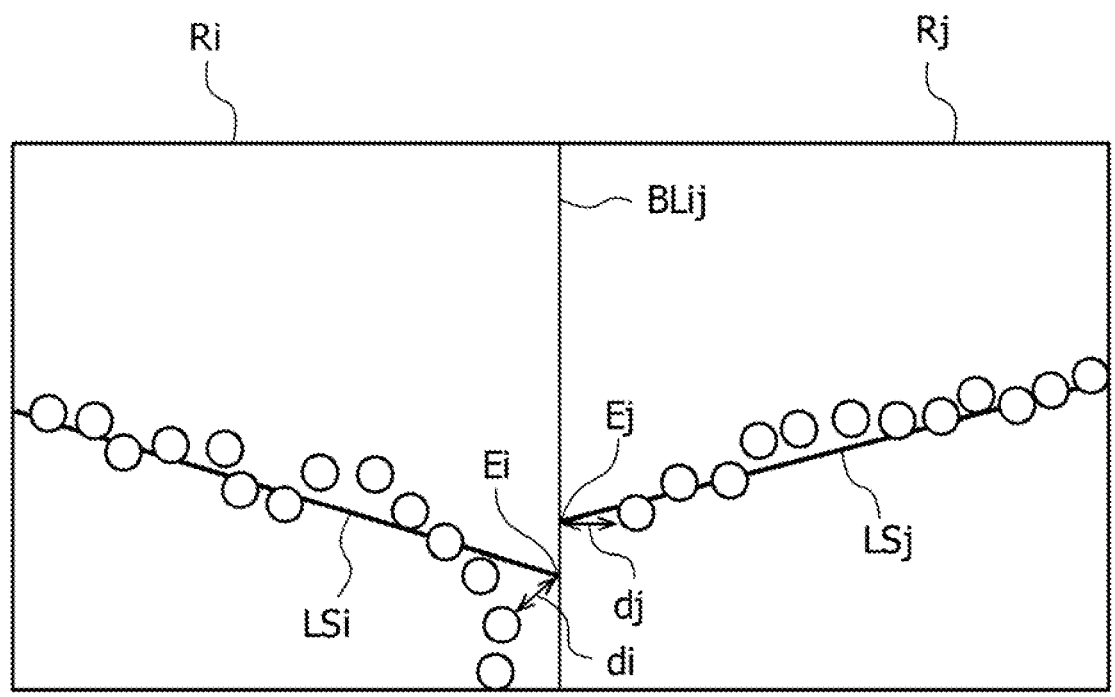
FIG. 8 is a conceptual diagram explaining a degree of continuity.

As exemplified in FIG. 8, $d_i$ is a distance between an end point $E_i$ of the basic line segment $LS_i$ on a boundary $BL_{ij}$ and a crack point in a region R closest to the end point $E_i$, and $d_j$ is a distance between an end point $E_j$ of the basic line segment $LS_j$ on the boundary $BL_{ij}$ and a crack point in a region $R_j$ closest to the end point $E_j$. Note that, ct2 is a predetermined value, and may be, for example, the same as a value of height or width of the region; for example, it may be 100 pixels.

When the distance $d_i$ is larger than the value of ct2, the value of 1 $d_i$/ct2 takes a negative value; however, according to Equation (9), the value 0 is taken, so that $pco_i$ takes a value of equal to or greater than 0 and equal to or smaller than 1. When the distance $d_i$ is 0, for example, when the end point E of the line segment $LS_j$ on the boundary $BL_{ij}$ and a crack point closest to the end point $E_j$ coincide with each other, $pco_i$ is 1.

When the distance $d_j$ is larger than the value of ct2, the value of $1-d_j$/ct2 takes a negative value; however, according to Equation (10), the value 0 is taken, so that $pco_j$ takes a value of equal to or greater than 0 and equal to or smaller than 1. When the distance $d_j$ is 0, for example, when the end point $E_3$ of the line segment $LS_j$ on the boundary $BL_{ij}$ and a crack point closest to the end point $E_j$ coincide with each other, $pco_j$ is 1.

Accordingly, when the end point $E_i$ of the line segment $LS_i$ on the boundary $BL_{ij}$ coincides with the crack point closest to the end point $E_i$, and the end point $E_j$ of the line segment $LS_j$ on the boundary $BL_{ij}$ also coincides with the crack point closest to the end point $E_j$, the degree of continuity $pcon_{ij}$ is 1. The stroke detection unit 17 detects a stroke by selecting such routes from a plurality of routes included in a tree structure that the index values PV of the routes from the top to the bottom of the tree structure are largest. This makes it possible in the present embodiment to detect a stroke corresponding to a group of longest and continuous crack lines from among the candidates for crack lines representing crack points.

After recording the detected stroke, the stroke detection unit 17 deletes the routes corresponding to the recorded stroke from the tree structure. The stroke detection unit 17 repeats the processing of stroke detection by selecting, from the remaining routes included in the tree structure, such routes that the index values PV of the routes from the top to the bottom of the tree structure are largest. This is because, since there is a case in which a crack line branches, there is a possibility that a plurality of strokes is present in one tree structure. When there is no selectable route, the stroke detection unit 17 ends the stroke detection process. The stroke detection unit 17 may end the stroke detection process when there is no route that includes a predetermined number or more of branches, for example, line segments, Although an example has been described in which the degree of distance, the degree of inclination difference, and the degree of continuity are used as the degree of coupling probability, the present embodiment is not limited thereto. For example, any one or two of the degree of distance, the degree of inclination difference, and the degree of continuity may be used as the degree of coupling probability. When any two of them are to be used, for example, the degree of distance and the degree of inclination difference may be used.

The degree of coupling probability TP may not be calculated between adjacent line segments within a route, but may be calculated among all the line segments within the route by using, for example, Equation (11).

$$TP=\frac{\sum_{i=1}^{N}\sum_{k=1}^{N}p_{ik}}{N^2} \quad (11)$$

In this case, $p_{ik}$ is calculated by Equation (12).

$$p_{ik}=pg_{ik} \cdot pan_{ik} \cdot pcon_{ik} \quad (12)$$

Figure 9:
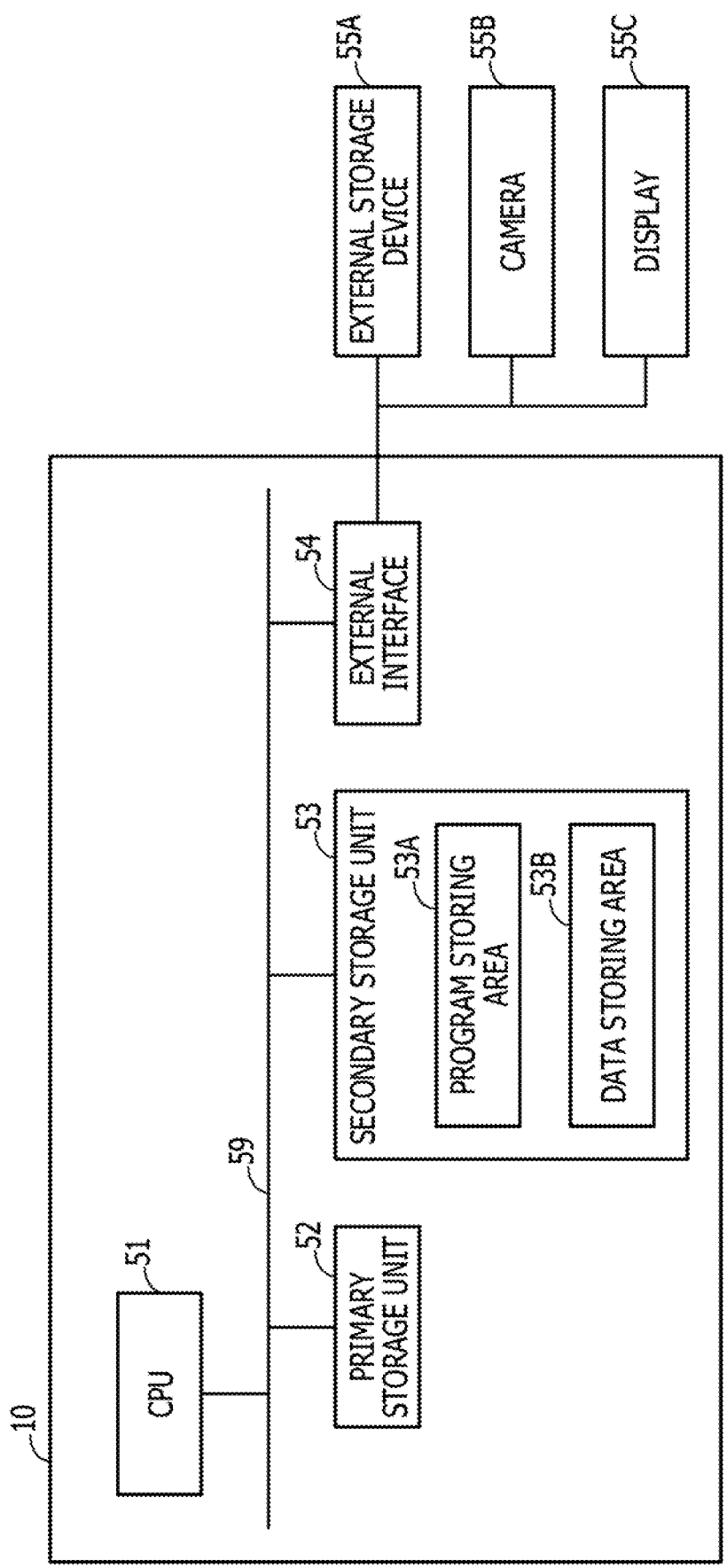
FIG. 9 is a block diagram illustrating an example of hardware of a crack line detection apparatus.

FIG. 9 exemplifies a hardware configuration of the crack line detection apparatus 10. As illustrated in FIG. 9, the crack line detection apparatus 10 includes a central processing unit (CPU) 51, a primary storage unit 52, a secondary storage unit 53, and an external interface 54, for example.

The CPU 51 is an example of a processor which is hardware. The CPU 51, the primary storage unit 52, the secondary storage unit 53, and the external interface 54 are coupled to each other via a bus 59.

The primary storage unit 52 is a volatile memory such as a random-access memory (RAM). The secondary storage unit 53 is a nonvolatile memory such as a hard disk drive (HDD) or a solid state drive (SSD).

The secondary storage unit 53 includes a program storing area 53A and a data storing area 53B. As an example, the program storing area 53A stores programs such as a crack line detection program. As an example, the data storing area 53B stores information of crack points, intermediate data generated during the crack line detection program being executed, and the like.

The CPU 51 reads out the crack line detection program from the program storing area 53A and loads the program on the primary storage unit 52. The CPU 51 loads and executes the crack line detection program to serve as the crack point input unit 11, the region partitioning unit 12, the line segment detection unit 13, the end point movement unit 14, the line segment set detection unit 15, the tree structure generation unit 16, and the stroke detection unit 17 illustrated in FIG. 1.

Programs such as the crack line detection program may be stored in an external server, and may be loaded on the primary storage unit 52 via a network, Note that the programs such as the crack line detection program may be stored on a non-transitory recording medium such as a digital versatile disc (DVD), and may be loaded on the primary storage unit 52 via a recording medium reading device.

External devices are coupled to the external interface 54, and the external interface 54 manages transmission and reception of various kinds of information between the external devices and the CPU 51, FIG. 9 illustrates an example in which an external storage device 55A, a camera 55B, and a display 55C are coupled to the external interface 54.

An image including crack points obtained by photographing a surface of a structure such as a bridge may have been recorded on the external storage device 55A or may be captured with the camera 55B. The detected stroke may be recorded on the external storage device 55A, or may be displayed as an image on the display 55C. The structure may be, for example, a wall of a building or a road.

None of the external storage device 55A, the camera 55B, and the display 55C may be coupled to the external interface 54, or only one or two of them may be coupled to the external interface 54. Further, any or all of the external storage device 55A, the camera 55B, and the display 55C may be built in the crack line detection apparatus 10, or may be disposed at a location remote from the crack line detection apparatus 10 via the network.

The crack line detection apparatus 10 may be a dedicated apparatus, or may be a general-purpose apparatus such as a workstation, a personal computer, or a tablet.

Next, an outline of operations of a crack line detection process will be described, FIG. 10 exemplifies a flow of a crack line detection process. The CPU 51 executes a line segment detection process in step 101, executes an end point movement process in step 102, executes a line segment set detection process in step 103, and executes a stroke detection process in step 104.

Figure 10:
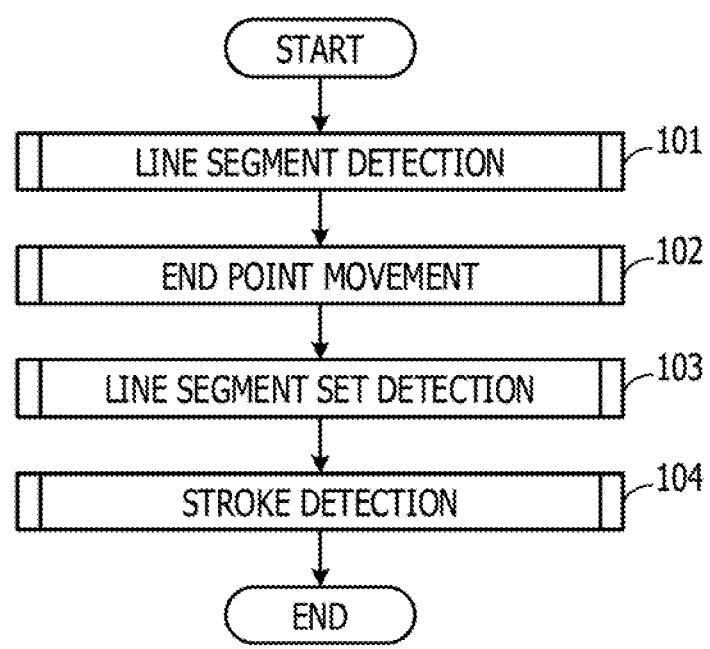
FIG. 10 is a flowchart illustrating an example of a crack line detection process flow.
Figure 11:
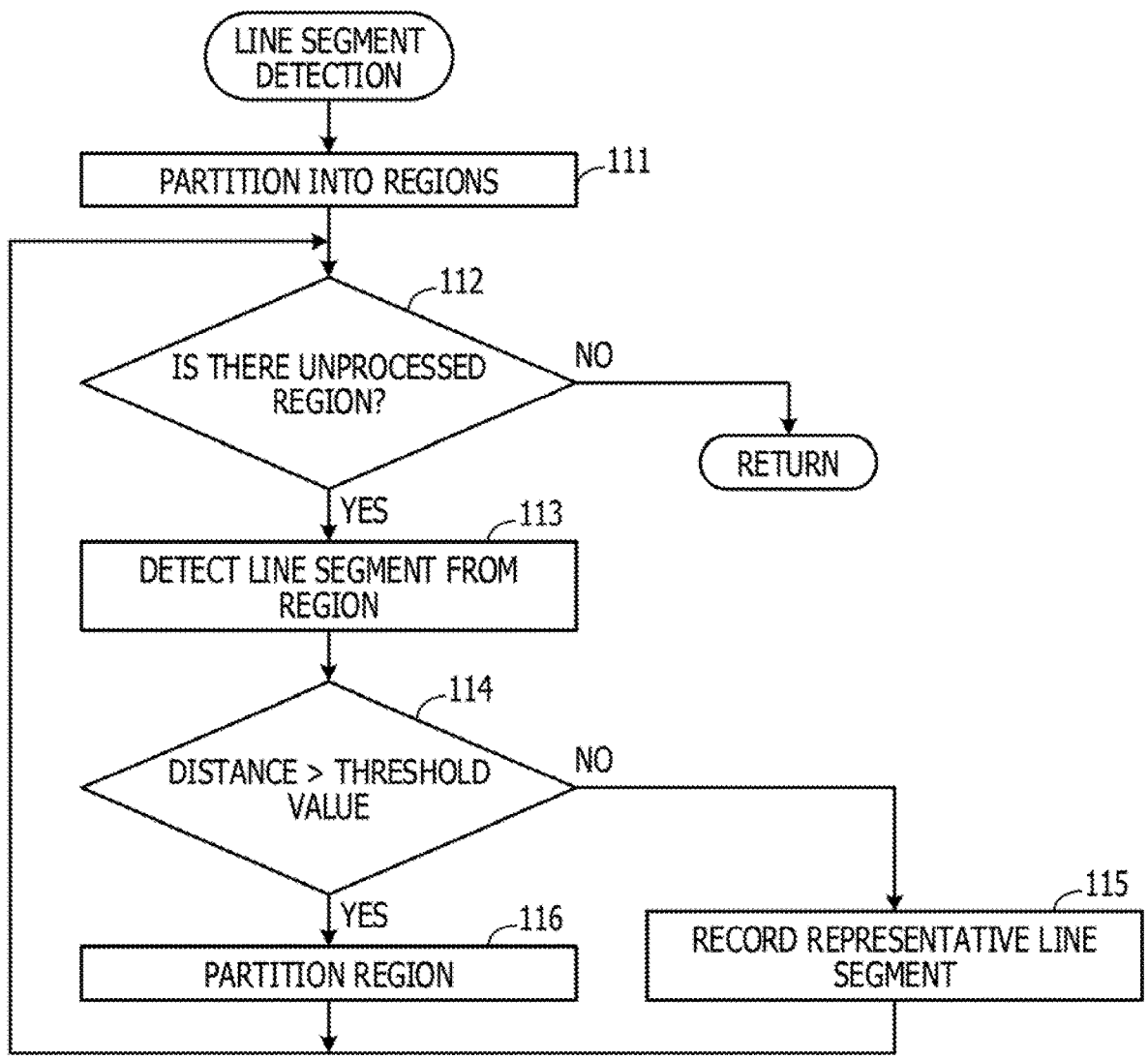
FIG. 11 is a flowchart illustrating an example of a line segment detection flow.

FIG. 11 exemplifies a flow of the line segment detection process in step 101 of FIG. 10. In step 111, the CPU 51 partitions an image acquired by photographing a structure into regions having a predetermined size. In step 112, the CPU 51 determines whether or not there exists an unprocessed region. When the determination in step 112 is negative, the CPU 51 ends the line segment detection process.

When the determination in step 112 is affirmative, the CPU 51 detects a representative line segment representing crack points within a region in step 113. The line segment representing the crack points within the region may be, for example, a regression line. In step 114, the CPU 51 determines whether or not an average value of distances between the representative line segment and the crack points is greater than a predetermined threshold value.

When the determination in step 114 is negative, the CPU 51 records the representative line segment in step 115 and returns to step 112. When the determination in step 114 is affirmative, the CPU 51 partitions the region into small regions in step 116, considers the small regions as new unprocessed regions, and returns to step 112.

Figure 12:
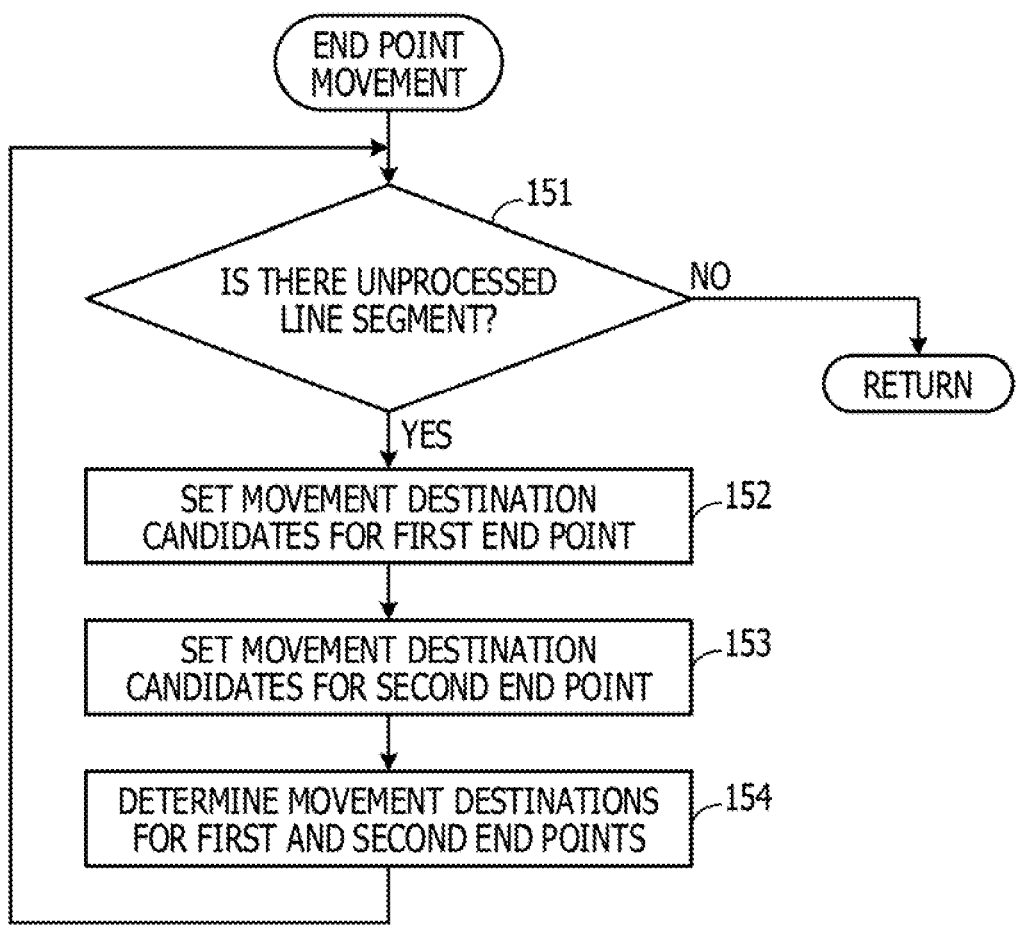
FIG. 12 is a flowchart illustrating an example of an end point movement process flow.

FIG. 12 exemplifies a flow of the end point movement process in step 102 of FIG. 10. In step 151, the CPU 51 determines whether or not there exists an unprocessed representative line segment. When the determination in step 151 is negative, the CPU 51 ends the end point movement process.

When the determination in step 151 is affirmative, the CPU 51 sets movement destination candidates for a first end point of the representative line segment in step 152. For example, a crack point on a region boundary closest to the first end point and a crack point whose projecting point to the representative line segment is farthest from a second end point of the representative line segment are set as the movement destination candidates. When there is no crack point on the region boundary, the crack point whose projecting point to the representative line segment is farthest from the second end point of the representative line segment is set as the movement destination candidate.

In step 153, the CPU 51 sets movement destination candidates for the second end point of the representative line segment. For example, a crack point on a region boundary closest to the second end point and a crack point whose projecting point to the representative line segment is farthest from the first end point of the representative line segment are set as the movement destination candidates. When there is no crack point on the region boundary the crack point whose projecting point to the representative line segment is farthest from the first end point of the representative line segment is set as the movement destination candidate.

In step 154, when there are two movement destination candidates for at least one of the first end point and the second end point, the CPU 51 determines one of the two movement destination candidates as the movement destination. Which of the two movement destination candidates is to be taken as the movement destination is determined based on which of the movement destinations for the first or second end point will cause an end point movement line segment to be generated to represent the crack points more appropriately in the region.

For example, the decision may be made based on which of the movement destinations for the first or second end point will bring a situation in which a larger number of crack points are present in the vicinity of the end point movement line segment. In step 154, in a case where there exists one movement destination candidate for at least one of the first end point and the second end point, the CPU 51 determines the movement destination candidate as the movement destination. The CPU 51 returns to step 151.

Figure 13:
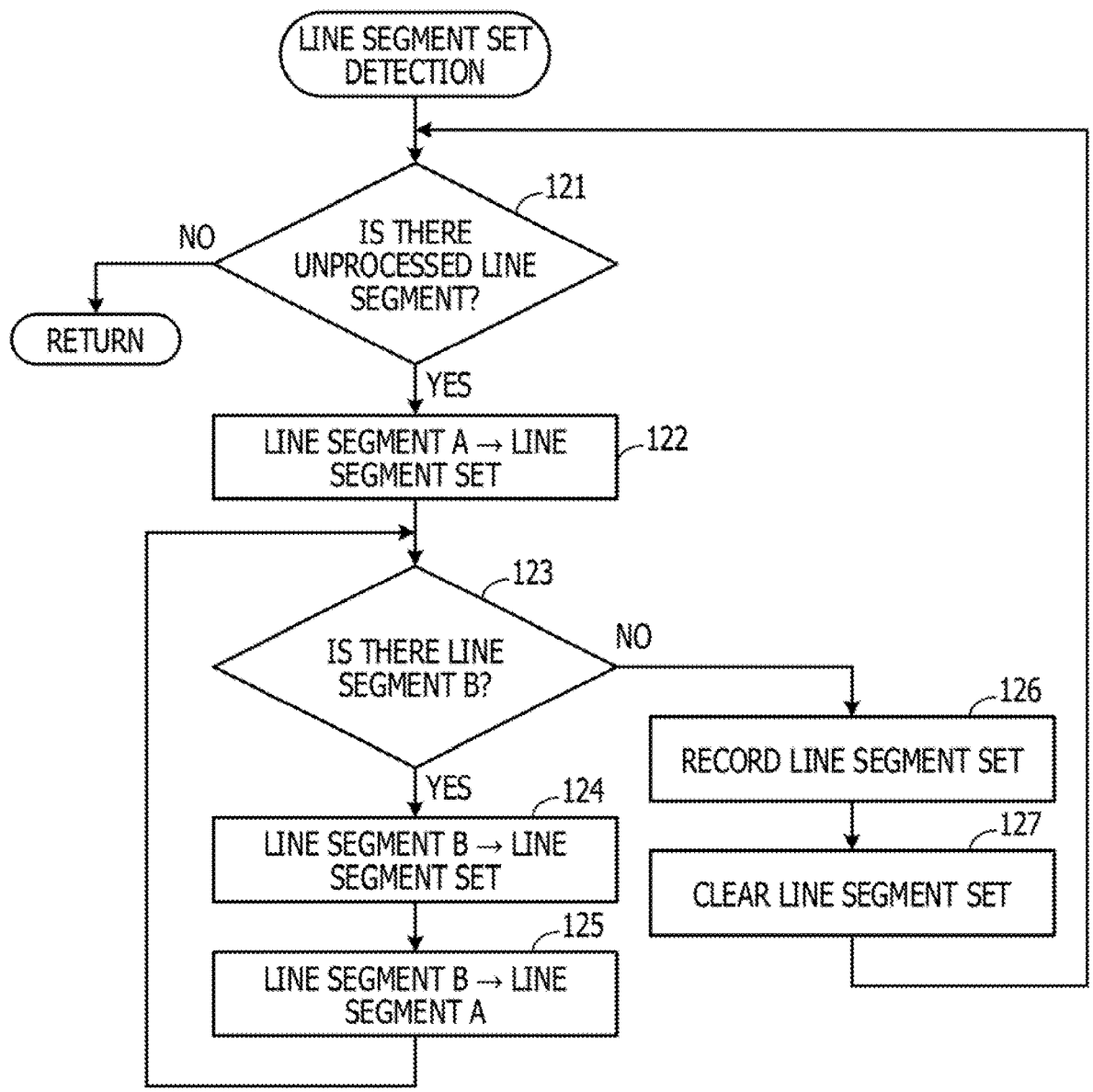
FIG. 13 is a flowchart illustrating an example of a line segment set detection process flow.

FIG. 13 exemplifies a flow of the line segment set detection process in step 103 of FIG. 10. In step 121, the CPU 51 determines whether or not there exists an unprocessed line segment not included in any line segment set. When the determination in step 121 is negative, the CPU 51 ends the line segment set detection process.

In step 122, the CPU 51 puts one arbitrary line segment A in a line segment set. In step 123, the CPU 51 determines whether or not there exists a line segment B having such an end point that a distance between the stated end point and any one of end points of the line segment A is smaller than a threshold value. When the determination in step 123 is affirmative, the CPU 51 puts, in step 124, all the line segments B that meet the condition in the line segment set. In step 125, the CPU 51 sets all the line segments B to new line segments A, and returns to step 123.

In step 123, when there is a plurality of line segments A, it is determined whether or not there exists a line segment B having such an end point that a distance between the stated end point and any one of end points of all the line segments A is smaller than the threshold value. When the determination in step 123 is affirmative, the CPU 51 proceeds to step 124. When the determination in step 123 is negative, the CPU 51 records the line segment set, and sets the line segments in the line segment set as the processed line segments in step 126, clears the line segment set in step 127, and returns to step 121.

Figure 14:
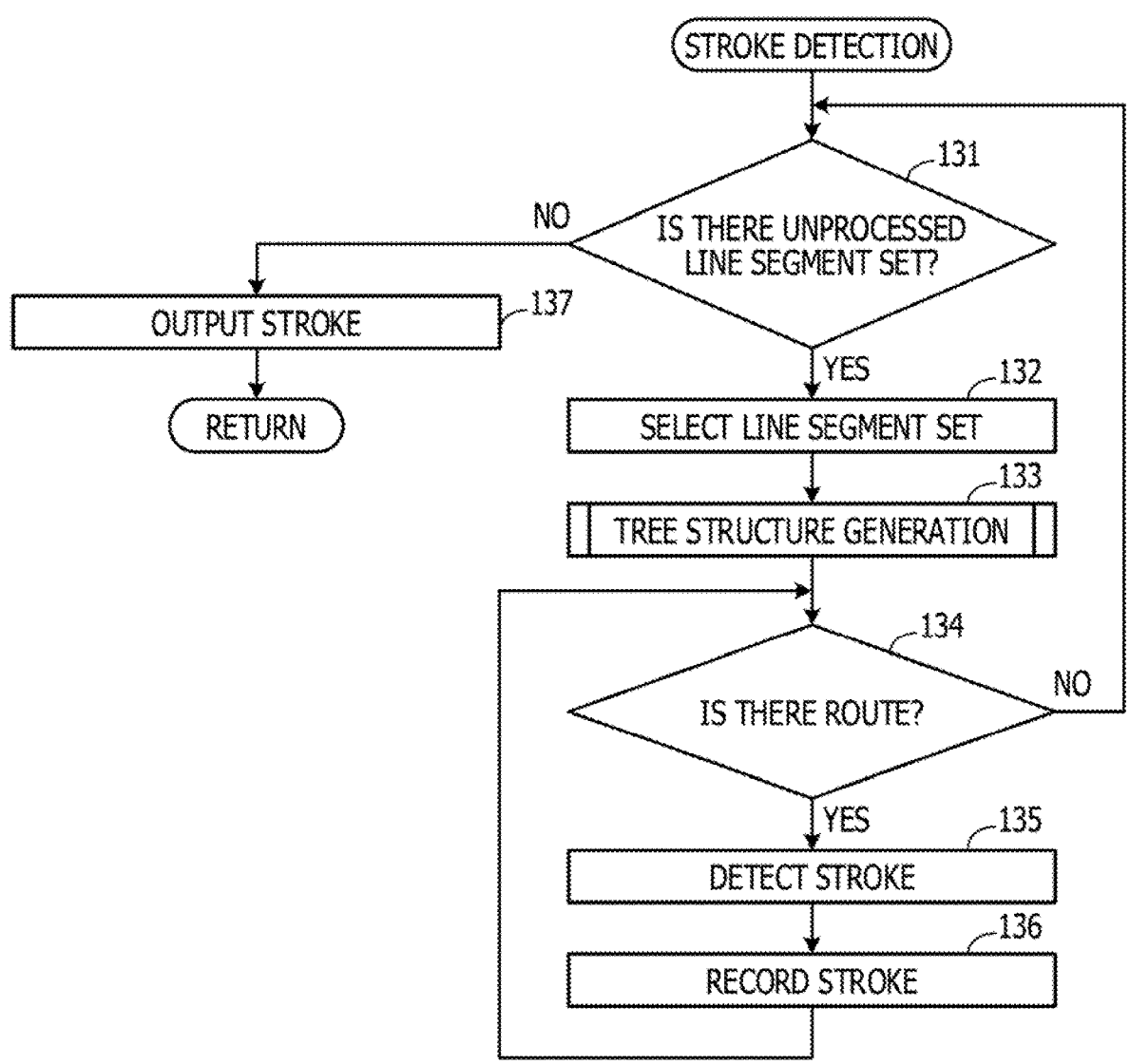
FIG. 14 is a flowchart illustrating an example of a stroke detection process flow.

FIG. 14 exemplifies the stroke detection process in step 104 of FIG. 10. In step 131, the CPU 51 determines whether or not there is an unprocessed line segment set. When the determination in step 131 is affirmative, the CPU 51 selects, in step 132, any line segment set in the case where a plurality of line segment sets is present. In step 133, the CPU 51 generates a tree structure corresponding to line segments included in a subset.

In step 134, the CPU 51 determines whether or not there is a route in the tree structure. When the determination in step 134 is affirmative, the CPU 51 detects a stroke, in step 135, by selecting such routes from a plurality of routes included in the tree structure that the index values of the routes from the top to the bottom of the tree structure are largest. The CPU 51 records the detected stroke and deletes the routes from the tree structure in step 136 and returns to step 134.

When the determination in step 134 is negative, for example, when there is no route in the tree structure, the CPU 51 returns to step 131. In step 131, the CPU 51 determines whether or not there is an unprocessed line segment set; when the determination in step 131 is negative and there exists the stroke having been recorded in step 136, the CPU 51 outputs the stroke in step 137 and ends the stroke detection process.

Figure 16A:
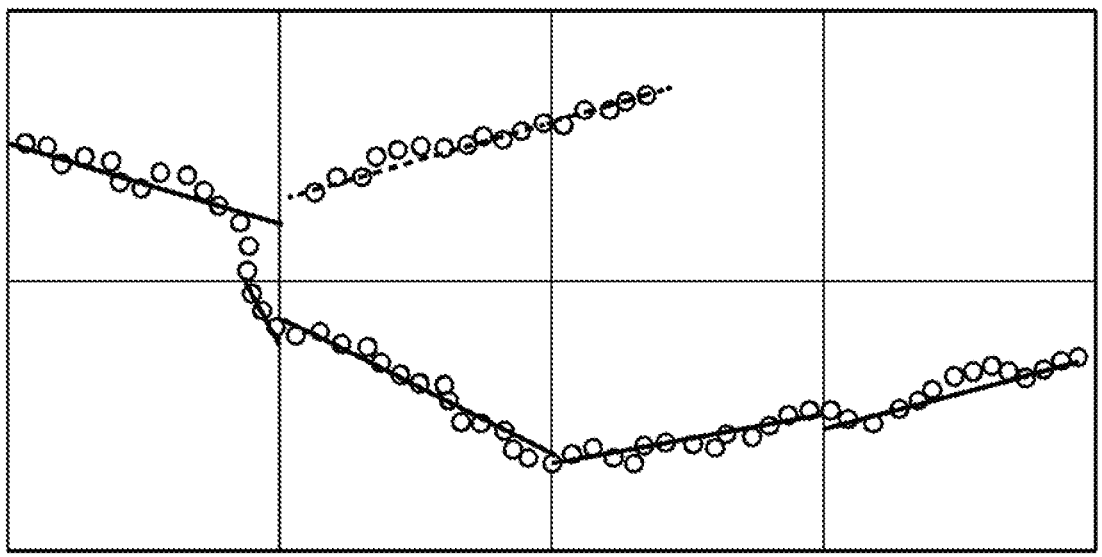
FIG. 16A is a diagram illustrating an example of a stroke detected in the embodiment.

When the stroke is output in step 137, the stroke may be displayed as an image on the display 55C, for example, as exemplified with a solid line and a broken line in FIG. 16A. The solid line represents line segments included in a route corresponding to a first stroke, and the broken line represents line segments included in a route corresponding to a second stroke, for example.

The stroke may be represented by a curved line approximating a polygonal line formed by coupling line segments included in the routes corresponding to the stroke. The curved line approximating the polygonal line, is produced by a known technique. The stroke may be recorded in, for example, the external storage device 55A in which an identification number of the stroke and information of line segments included in the routes corresponding to the stroke are associated with each other.

Figure 15:
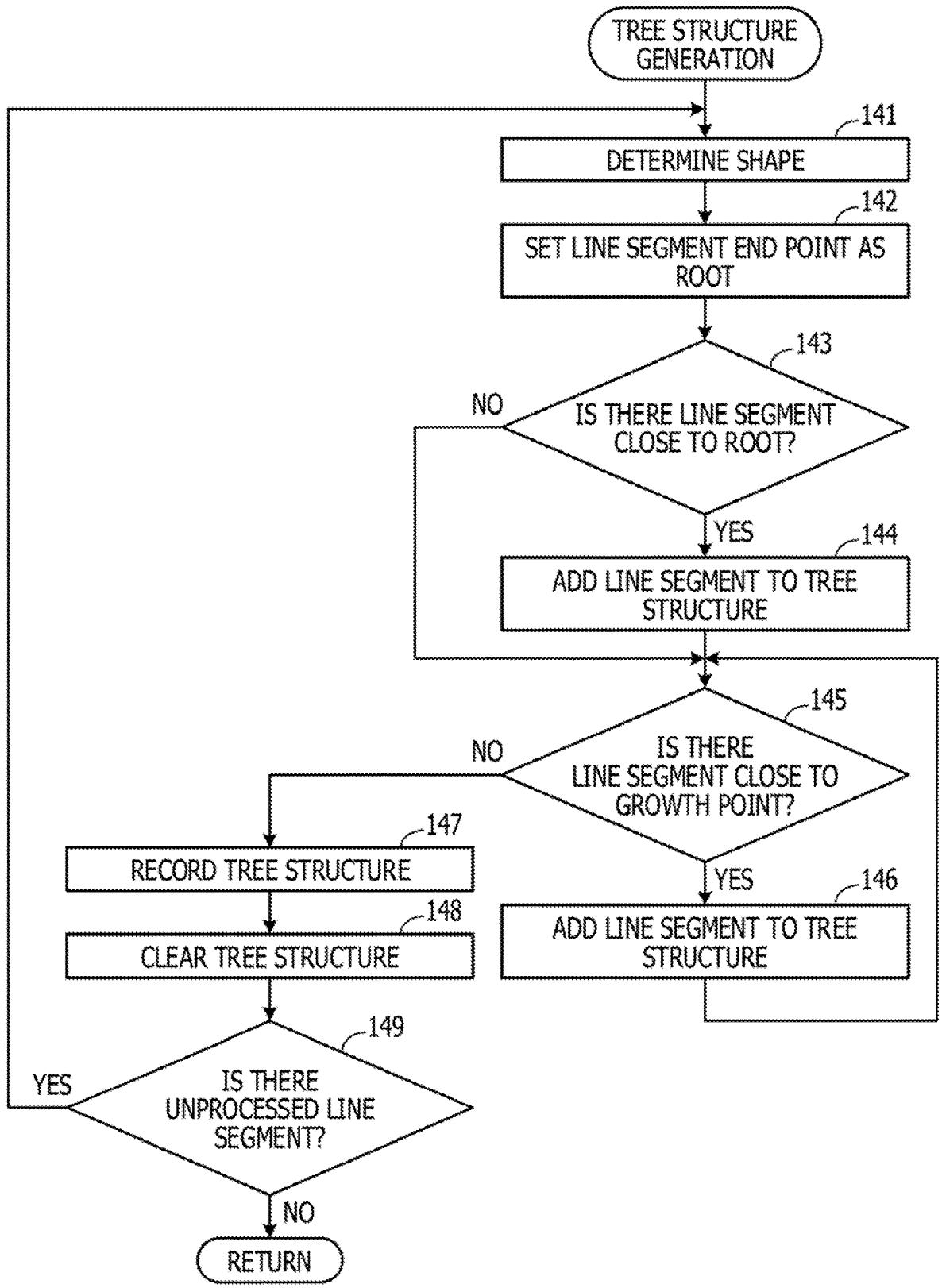
FIG. 15 is a flowchart illustrating an example of a tree structure generation process flow.

FIG. 15 exemplifies the tree structure generation process in step 133 of FIG. 14. In step 141, the CPU 51 determines the overall shape of a tree structure from the overall shape of a line segment set. When the overall shape of the tree structure is extended in the lateral direction, a line segment having an end point on the leftmost side is selected, and when the overall shape of the tree structure is extended in the longitudinal direction, a line segment having an end point on the uppermost side is selected.

In step 142, when the overall shape of the tree structure is extended in the lateral direction, the CPU 51 sets an end point on the left side of the line segment as a root, and when the overall shape of the tree structure is extended in the longitudinal direction, the CPU 51 sets an end point on the upper side of the line segment as a root. In step 143, the CPU 51 determines whether or not there exists a line segment having such an end point that a distance between the root and the stated end point is equal to or smaller than a predetermined value. There may be a plurality of line segments each having such an end point that the distance between the root and the end point is equal to or smaller than the predetermined value.

When the determination in step 143 is affirmative, the CPU 51 adds the line segment to the tree structure in step 144, and proceeds to step 145. When the determination in step 143 is negative, the CPU 51 proceeds to step 145. In step 145, the CPU 51 takes an end point on the opposite side to the root of the line segment included in the tree structure as a growth point, and determines whether or not there exists a line segment having such an end point that a distance between the growth point and the end point is equal to or smaller than a predetermined value. There may be a plurality of line segments each having such an end point that the distance between the growth point and the end point is equal to or smaller than the predetermined value.

When the determination in step 145 is affirmative, the CPU 51 adds the line segment, as a growth line segment, to the tree structure in step 146, and returns to step 145. In step 145, the CPU 51 takes an end point on the opposite side to the growth point of the growth line segment included in the tree structure as a new growth point, and determines whether or not there exists a line segment having such an end point that a distance between the growth point and the end point is equal to or smaller than a predetermined value.

When the determination in step 145 is negative, for example, when there is no line segment having such an end point that the distance between the growth point and the end point is equal to or smaller than the predetermined value, the CPU 51 records the tree structure in step 147. In step 148, the CPU 51 clears the tree structure.

In step 149, the CPU 51 determines whether or not there is an unprocessed line segment in the line segment set, for example, determines whether or not there exists a line segment not included in the tree structure. When the determination in step 149 is affirmative, the CPU 51 returns to step 141 and repeats the processing in step 141 to step 149 for the unprocessed line segment. When the determination in step 149 is negative, the CPU 51 ends the tree structure generation process.

Figure 16B:
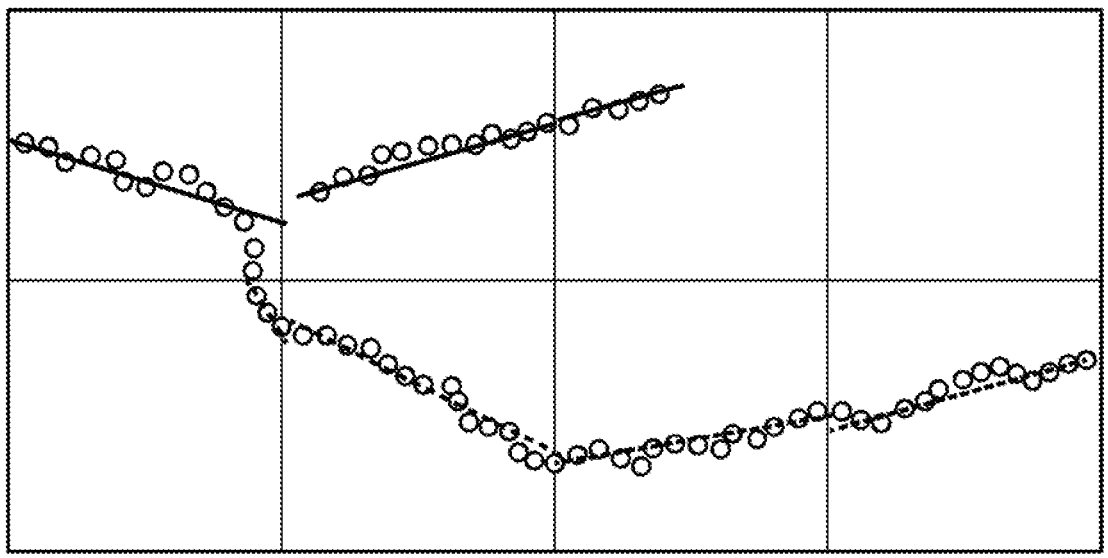
FIG. 16B is a diagram illustrating an example of a stroke detected in the related art.

FIG. 16B exemplifies a stroke detected in the related art. A line segment included in a first stroke is represented with a solid line, and a line segment included in a second stroke is represented with a broken line. In the related art, since the stroke is detected by coupling the line segments based on only the relationship between adjacent line segments, a stroke corresponding to a group of longest and continuous crack lines is not detected.

On the other hand, regarding the stroke detected in the present embodiment exemplified in FIG. 15A, it is possible to detect a stroke, as the first stroke, corresponding to a group of longest and continuous crack lines, as indicated with the solid line. This is because, in the present embodiment, the routes from the top to the bottom of the tree structure corresponding to a basic line segment group in which values indicating the degrees of coupling probability between the basic line segments are highest and the total length of the basic line segments coupled is longest, are detected as a stroke corresponding to the crack lines.

In order to check a cracking state of a structure such as a bridge, an operation to record, on a drawing, cracks in a surface of the structure is carried out by visual inspection and handwriting. The operator describes crack lines by handwriting on a drawing while referring to, for example, a photograph or the like. The crack lines are described in the form of a stroke, which is a longest and continuous line including the crack lines. In the present embodiment, it is possible to acquire a resultant product similar to the recording of crack lines by an operator while reducing the operation time and the amount of work.

The flowcharts in FIGS. 10 to 15 are merely examples, and details of the steps and the order of the steps may be appropriately changed.

In this embodiment, an image acquired by photographing a structure is partitioned into a plurality of regions; among the plurality of regions, for a plurality of target regions including a plurality of crack points, a representative line segment representing a plurality of crack points included in each of the plurality of target regions is detected as a basic line segment for each of the plurality of target regions, Based on basic line segments whose end points are close to each other among the detected basic line segments, a tree structure having an end point of a specific basic line segment as a root is generated. Among a plurality of routes in the generated tree structure, routes from the top to the bottom of the tree structure corresponding to a basic line segment group in which values indicating the degrees of coupling probability between the basic line segments are highest and the total length of the basic line segments coupled is longest, are detected as a stroke corresponding to crack lines.

This makes it possible in the present embodiment to detect a stroke corresponding to a group of longest and continuous crack lines from among the candidates for crack lines representing crack points.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention, Although one or more embodiments of the present invention have been described in detail, it should be understood that the various changes, substitutions, and alterations could be made hereto without departing from the spirit and scope of the invention.

What is claimed is:

1. An information processing apparatus comprising:
   a memory; and
   a processor coupled to the memory and configured to:
   partition an image acquired by photographing a structure into a plurality of regions;
   detect, for a plurality of target regions each including a plurality of crack points among the plurality of regions, a representative line segment representing the plurality of crack points included in each of the plurality of target regions as a basic line segment for each of the plurality of target regions;
   generate, based on basic line segments whose end points are close to each other among the detected basic line segments, a tree structure having an end point of a specific basic line segment as a root; and
   detect, among a plurality of routes in the generated tree structure, routes from a top to a bottom of the tree structure corresponding to a basic line segment group in which values indicating degrees of coupling probability between the basic line segments are highest and a total length of the basic line segments coupled is longest, as a stroke corresponding to crack lines,
   wherein the degree of coupling probability is determined based on a distance between adjacent basic line segments, an angle formed by basic line segments, and a distance between an end point on a boundary common to basic line segments included in adjacent regions and a crack point closest to the above end point.

2. The information processing apparatus according to claim 1, wherein the processor is configured to detect, among the routes remaining after removing the routes corresponding to the stroke from the tree structure, routes from the top to the bottom of the tree structure corresponding to a line segment group in which values indicating the degrees of coupling probability between the basic line segments are high and the total length of the basic line segments coupled is longest, as a stroke corresponding to the crack lines.

3. The information processing apparatus according to claim 1, wherein the processor is configured to:
   further partition, among the target regions, a target region in which an average value of distances between a plurality of crack points and the detected representative line segment is larger than a threshold value into a plurality of small regions; and
   take, among the plurality of small regions, a small region including a plurality of crack points as a new target region, and detects the representative line segment.

4. The information processing apparatus according to claim 1, wherein the processor is configured to generate an end point movement line segment by moving both end points of the representative line segment in such a manner that the degree of coupling probability becomes high while maintaining a state of representing the crack points, and add the generated end point movement line segment to the basic line segment.

5. A crack line detection method for causing a computer to execute a crack line detection process, the process comprising:
   partitioning an image acquired by photographing a structure into a plurality of regions;
   detecting, for a plurality of target regions each including a plurality of crack points among the plurality of regions, a representative line segment representing the plurality of crack points included in each of the plurality of target regions as a basic line segment for each of the plurality of target regions;
   generating, based on basic line segments whose end points are close to each other among the detected basic line segments, a tree structure having an end point of a specific basic line segment as a root; and
   detecting, among a plurality of routes in the generated tree structure, routes from the top to the bottom of the tree structure corresponding to a basic line segment group in which values indicating degrees of coupling probability between the basic line segments are highest and a total length of the basic line segments coupled is longest, as a stroke corresponding to crack lines, wherein the degree of coupling probability is determined based on a distance between adjacent basic line segments, an angle formed by basic line segments, and a distance between an end point on a boundary common to basic line segments included in adjacent regions and a crack point closest to the above end point.

6. The crack line detection method for causing the computer to execute the crack line detection process according to claim 5, the process further comprising:

detecting, among the routes remaining after removing the routes corresponding to the stroke from the tree structure, routes from the top to the bottom of the tree structure corresponding to a line segment group in which values indicating the degrees of coupling probability between the basic line segments are high and the total length of the basic line segments coupled is longest, as a stroke corresponding to the crack lines.

7. The crack line detection method for causing the computer to execute the crack line detection process according to claim 5, the process further comprising:

partitioning, among the target regions, a target region in which the average value of distances between a plurality of crack points and the detected representative line segment is larger than a threshold value into a plurality of small regions; and taking, among the plurality of small regions, a small region including a plurality of crack points as a new target region, and detecting the representative line segment.

8. The crack line detection method for causing the computer to execute the crack line detection process according to claim 5, the process further comprising:

generating an end point movement line segment by moving both end points of the representative line segment in such a manner that the degree of coupling probability becomes high while maintaining a state of representing the crack points, and adding the generated end point movement line segment to the basic line segments.

9. A non-transitory computer-readable recording medium having stored therein a program for causing a computer to execute a crack line detection process, the process comprising:

partitioning an image acquired by photographing a structure into a plurality of regions;

detecting, for a plurality of target regions including a plurality of crack points among the plurality of regions, a representative line segment representing a plurality of crack points included in each of the plurality of target regions as a basic line segment for each of the plurality of target regions;

generating, based on basic line segments whose end points are close to each other among the detected basic line segments, a tree structure having an end point of a specific basic line segment as a root; and detecting, among a plurality of routes in the generated tree structure, routes from the top to the bottom of the tree structure corresponding to a basic line segment group in which values indicating degrees of coupling probability between the basic line segments are highest and a total length of the basic line segments coupled is longest, as a stroke corresponding to crack lines, wherein the degree of coupling probability is determined based on a distance between adjacent basic line segments, an angle formed by basic line segments, and a distance between an end point on a boundary common to basic line segments included in adjacent regions and a crack point closest to the above end point.

10. The non-transitory computer-readable recording medium having; stored therein the program for causing the computer to execute the crack line detection process according to claim 9, the process further comprising:

detecting, among the routes remaining after removing the routes corresponding to the stroke from the tree structure, routes from the top to the bottom of the tree structure corresponding to a line segment group in which values indicating the degrees of coupling probability between the basic line segments are high and the total length of the basic line segments coupled is longest, as a stroke corresponding to the crack lines.

11. The non-transitory computer-readable recording medium having stored therein the program for causing the computer to execute the crack line detection process according to claim 9, the process further comprising:

partitioning, among the target regions, a target region in which the average value of distances between a plurality of crack points and the detected representative line segment is larger than a threshold value into a plurality of small regions; and taking, among the plurality of small regions, a small region including a plurality of crack points as a new target region, and detecting the representative line segment.

12. The non-transitory computer-readable recording medium having stored therein the program for causing the computer to execute the crack line detection process according to claim 9, the process further comprising:

generating an end point movement line segment by moving both end points of the representative line segment in such a manner that the degree of coupling probability becomes high while maintaining a state of representing the crack points, and adding the generated end point movement line segment to the basic line segment.

* * * * *